(12) United States Patent
Bristol et al.

(10) Patent No.: US 11,695,287 B2
(45) Date of Patent: Jul. 4, 2023

(54) APPARATUS, SYSTEM, AND METHOD FOR CHARGING ARTIFICIAL-REALITY DISPLAYS

(71) Applicant: META PLATFORMS TECHNOLOGIES, LLC, Menlo Park, CA (US)

(72) Inventors: Peter Wesley Bristol, Seattle, WA (US); Ines Le Bihan, Seattle, WA (US); Eric Daniels, San Francisco, CA (US); Igor Markovsky, Campbell, CA (US); Punit Narendra Govenji, Pleasanton, CA (US); Raymond Lee, Palo Alto, CA (US); Benjamin Elliott Tunberg Rogoza, Leavenworth, WA (US); Jaykishan Dakshesh Choksi, Santa Clara, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 181 days.

(21) Appl. No.: 17/213,693

(22) Filed: Mar. 26, 2021

(65) Prior Publication Data

US 2022/0231523 A1    Jul. 21, 2022

Related U.S. Application Data

(60) Provisional application No. 63/139,646, filed on Jan. 20, 2021.

(51) Int. Cl.
*H01M 10/46* (2006.01)
*H02J 7/00* (2006.01)
(Continued)

(52) U.S. Cl.
CPC ............ *H02J 7/0044* (2013.01); *A45C 11/04* (2013.01); *A45C 15/00* (2013.01); *H02J 7/342* (2020.01)

(58) Field of Classification Search
CPC ........ H02J 7/0044; H02J 7/0042; H02J 7/342; H02J 50/005; H02J 50/10; A45C 11/04; A45C 15/00
(Continued)

(56) References Cited

U.S. PATENT DOCUMENTS 9,971,171 B1    5/2018  Lin
10,993,515 B1*  5/2021  Kim ........................ G06F 3/011
(Continued)

FOREIGN PATENT DOCUMENTS

WO    WO-2018066346 A1 *  4/2018  ............. A45C 11/04

OTHER PUBLICATIONS

International Search Report and Written Opinion for International Application No. PCT/US2022/013024, dated Apr. 13, 2022, 10 pages.

*Primary Examiner* — Edward Tso
(74) *Attorney, Agent, or Firm* — Greenberg Traurig, LLP

(57) ABSTRACT

A disclosed system may include (1) an artificial-reality display dimensioned to be worn by a user, the artificial-reality display comprising (A) a battery and (B) at least one recipient charging element, and (2) a charging case dimensioned to accommodate the artificial-reality display, the charging case comprising (A) at least one source charging element configured to interface with the recipient charging element of the artificial-reality display to facilitate charging the battery of the artificial-reality display and (B) at least one alignment guide that forces the recipient charging element of the artificial-reality display to energizingly couple with the
(Continued)

source charging element of the charging case. Various other apparatuses, systems, and methods are also disclosed.

18 Claims, 16 Drawing Sheets

(51) Int. Cl.
*H02J 7/34* (2006.01)
*A45C 11/04* (2006.01)
*A45C 15/00* (2006.01)

(58) Field of Classification Search
USPC .................................. 320/107, 108, 114, 115
See application file for complete search history.

(56) References Cited

U.S. PATENT DOCUMENTS

| | | |
|---|---|---|
| 2020/0073148 A1 | 3/2020 | Alhaideri et al. |
| 2020/0096774 A1 | 3/2020 | Trail |
| 2020/0383441 A1 | 12/2020 | Kan et al. |

\* cited by examiner

APPARATUS, SYSTEM, AND METHOD FOR CHARGING ARTIFICIAL-REALITY DISPLAYS

CROSS-REFERENCE TO RELATED APPLICATION

This application claims the benefit of priority under 35 U.S.C. § 119(e) to U.S. Provisional Application No. 63/139,646 filed Jan. 20, 2021, the contents of which are incorporated herein by reference in their entirety.

BRIEF DESCRIPTION OF DRAWINGS AND APPENDIX

The accompanying Drawings illustrate a number of exemplary embodiments and are parts of the specification. Together with the following description, the Drawings demonstrate and explain various principles of the instant disclosure.

Figure 1:
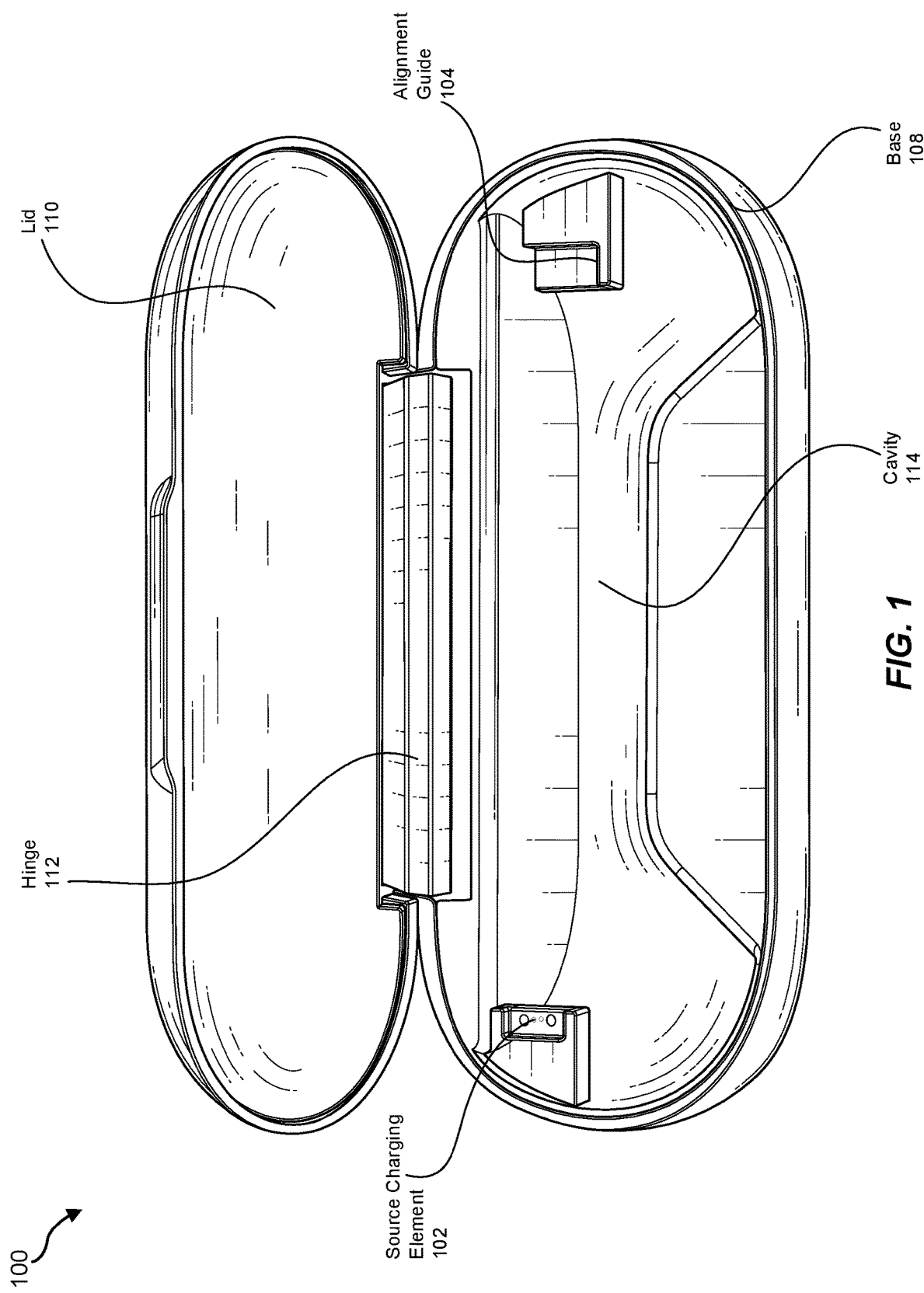
FIG. 1 is an illustration of an exemplary charging case for charging artificial-reality displays according to one or more embodiments of this disclosure.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, combinations, equivalents, and alternatives falling within this disclosure.

DETAILED DESCRIPTION

The present disclosure is generally directed to charging artificial-reality displays via cases designed and/or dimensioned to house, store, or protect those artificial-reality displays. As will be explained in greater detail below, these apparatuses, systems, and methods may provide numerous features and benefits.

Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and/or configurations. Some artificial-reality systems may be designed to work without near-eye displays (NEDs). Other artificial-reality systems may include an NED that also provides visibility into the real world or that visually immerses a user in an artificial reality. While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Artificial reality may provide a rich, immersive experience in which users are able to interact with virtual objects and/or environments in one way or another. In this context, artificial reality may constitute a form of reality that has been altered by virtual objects for presentation to a user. Such artificial reality may include and/or represent virtual reality, augmented reality, mixed reality, hybrid reality, or some combination and/or variation of one or more of the same.

Although artificial-reality systems are commonly implemented for gaming and other entertainment purposes, such systems are also implemented for purposes outside of recreation. For example, governments may use them for military training simulations, doctors may use them to practice surgery, engineers may use them as visualization aids, and co-workers may use them to facilitate inter-personal interactions and collaboration from across the globe.

Artificial reality may be provided, supported, and/or facilitated by display systems, such as eyeglasses worn by users. In some examples, artificial-reality displays may appear similar and/or identical to vision-correction and/or vision-improvement eyeglasses. Additionally or alternatively, artificial-reality displays may be placed in physical cases for housing, storing, and/or protection purposes. Such artificial-reality displays and their physical cases may also be designed to mate and/or engage with one another for the purpose of charging batteries that are incorporated into and/or used to power the artificial-reality displays.

As a specific example, a charging case for augmented-reality glasses may be designed and/or dimensioned to provide and/or ensure electrical continuity between the charging case and the augmented-reality glasses via one or more alignment guides (e.g., magnetic fasteners, indentations, mechanical pins, fiducial nodes, specifically designed dimensions within the charging case, etc.). For example, an alignment guide in the charging case may facilitate and/or support aligning the augmented-reality glasses in the correct position within the charging case. In such a position, electrical contacts on the augmented-reality glasses may be forced into electrical continuity with charging contacts in the charging case, thereby ensuring that the augmented-reality glasses continue charging despite improper placement by a user and/or jolts that would otherwise cause the electrical contacts on augmented-reality glasses to disengage from the charging contacts in the charging case.

In some examples, the alignment guide may be magnetic fasteners and/or mechanical grooves or indentations in the temple blocks of the charging case. In one example, the electrical contacts may be situated on at least one hinge block of the augmented-reality glasses and/or concealed within one or more hinges of the augmented-reality glasses. In this example, the charging contacts may be physical connectors and/or wireless charging coils. Additionally or alternatively, the charging case may be designed and/or dimensioned to apply pressure onto the augmented-reality glasses and thus secure electrical continuity when closed.

The following will provide, with reference to FIGS. 1-13, 15, and 16, detailed descriptions of exemplary apparatuses, devices, systems, components, and corresponding implementations for charging artificial-reality displays. In addition, detailed descriptions of methods for charging artificial-reality displays will be provided in connection with FIG. 14.

Figure 2:
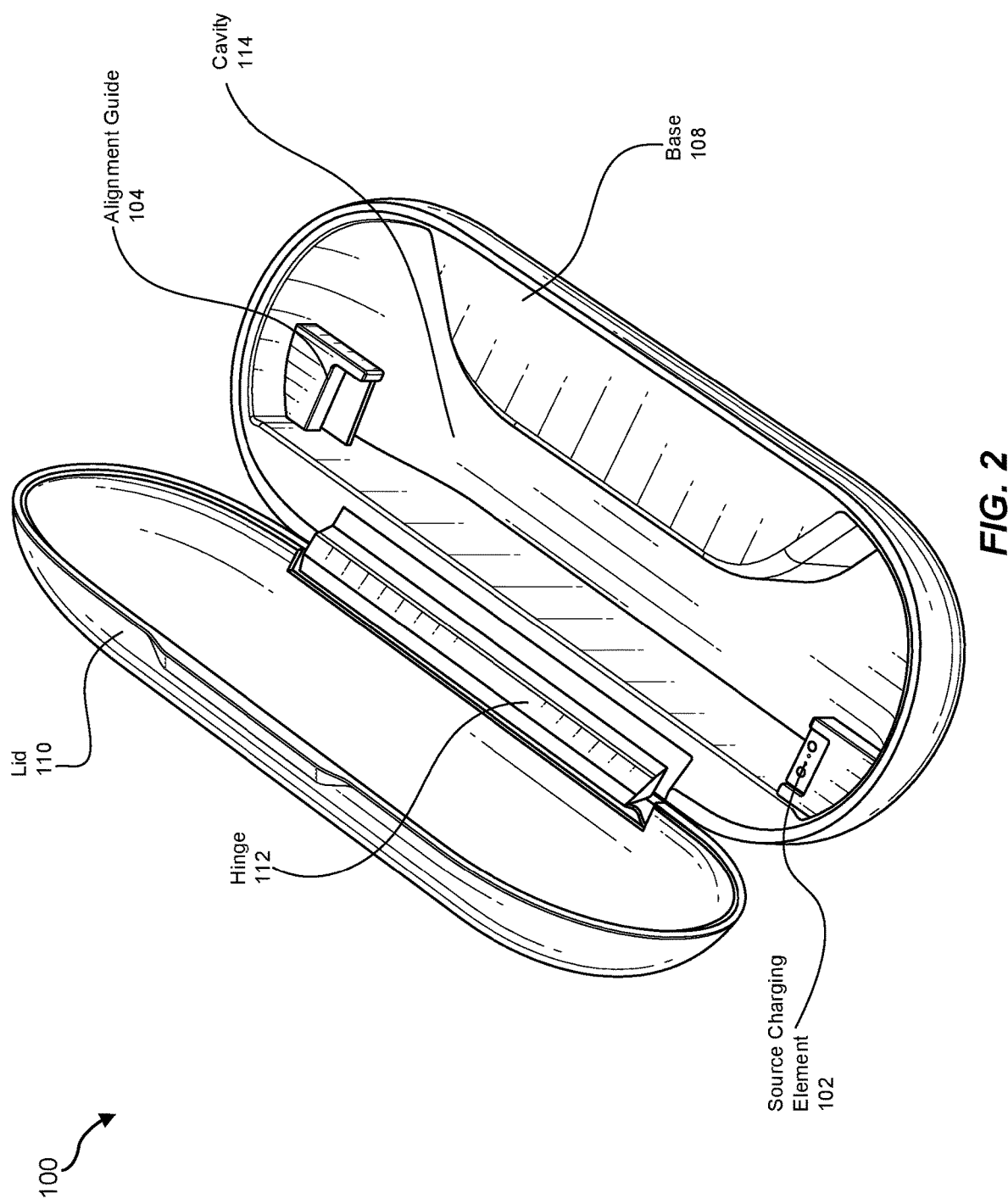
FIG. 2 is an illustration of an exemplary charging case for charging artificial-reality displays according to one or more embodiments of this disclosure.

FIGS. 1 and 2 illustrate an exemplary charging case 100 capable of charging artificial-reality displays. As illustrated in FIGS. 1 and 2, exemplary charging case 100 may include and/or represent a base 108, a cavity 114, and a lid 110. In some examples, lid 110 may be movably coupled to base 108 via a hinge 112 to facilitate opening and/or closing charging case 100. In one example, cavity 114 may be dimensioned and/or formed to accommodate and/or house an artificial-reality display (not illustrated in FIG. 1 or 2) within charging case 100. When placed in and/or near cavity 114 of charging case 100, the artificial-reality display may be forced into a specific position that facilitates charging a battery of the artificial-reality display.

As illustrated in FIGS. 1 and 2, charging case 100 may include and/or represent an alignment guide 104 and/or a source charging element 102. In some examples, alignment guide 104 may include and/or represent a combination of various features that collectively serve to ensure that the artificial-reality display is forced into and/or maintained at a specific position in which a recipient charging element of the artificial-reality display is energizingly coupled with source charging element 102 of the artificial-reality display. In one example, alignment guide 104 may include and/or represent one or more magnetic fasteners situated within charging case 100 to secure the artificial-reality display in a specific position for the purpose of establishing and/or maintaining such an energizing coupling. Additional examples of alignment guide 104 include, without limitation, mechanical pins, indentations formed within charging case 100, grooves formed within charging case 100, fiducial nodes, bespoke dimensions of charging case 100 and/or cavity 114, combinations or variations of one or more of the same, and/or any other suitable alignment guide.

In some examples, the phrase "to energizingly couple" and/or the term "energizing coupling" may refer to and/or represent any technique for and/or process of transferring electrical power from charging case 100 to the artificial-reality display. In such examples, charging case 100 and the artificial-reality display may achieve this power transfer for charging purposes by transferring electricity and/or electric current from charging case 100 to the artificial-reality display. In one example, the energizing coupling may include and/or represent an electrical coupling between source charging element 102 and the recipient charging element. For example, source charging element 102 may include and/or represent one or more electrical connectors, pins, and/or plugs configured to mate with the recipient charging element and/or facilitate charging the battery of the artificial-reality display via the electrical coupling. In this example, the recipient charging element may include and/or represent one or more electrical connectors, ports, and/or receptacles configured to mate with source charging element 102 and/or facilitate charging the battery of the artificial-reality display via the electrical coupling. Alternative embodiments may involve opposite configurations and/or roles of source charging element 102 and the recipient charging element such that source charging element 102 includes and/or represents the electrical connectors, ports, and/or receptacles and the recipient charging element includes and/or represents the electrical connectors, pins, and/or plugs.

In another example, the energizing coupling may include and/or represent an inductive and/or wireless-charging coupling between source charging element 102 and the recipient charging element. For example, source charging element 102 and/or the recipient charging element may each include and/or represent one or more electromagnetic coils configured to induce an electromotive force that facilitates charging the battery of the artificial-reality display via the inductive and/or wireless-charging coupling. In this example, alternating current may pass through source charging element 102, thus creating a magnetic field whose strength varies with the amplitude of the alternating current. The varying strength of this magnetic field may create corresponding alternating current at the recipient charging element. The corresponding alternating current may then pass through a rectifier, which converts the alternating current to direct current that in turn charges the battery of the artificial-reality display.

Charging case 100 may include and/or form any shape suitable for enclosing, protecting, and/or securing a certain type of artificial-reality display. In some examples, charging case 100 may form a cube, a cuboid, a sphere, and/or a spheroid. Additional examples of shapes formed by charging case 100 include, without limitation, cones, cylinders, prisms, pyramids, combinations or variations of one or more of the same, and/or any other suitable shapes.

Charging case 100 may be of any dimensions suitable for enclosing, protecting, and/or securing a certain type of artificial-reality display. In some examples, charging case 100 may be dimensioned to ensure that sufficient pressure is applied to the artificial-reality display to maintain electrical and/or inductive continuity between source charging element 102 and the recipient charging element. In such examples, the dimensions of charging case 100 may ensure that the artificial-reality display remains in the correct position within charging case 100 despite improper placement by a user and/or jolts that would otherwise cause source charging element 102 and the recipient charging element to disengage from each other.

Charging case 100 may include and/or contain any variety of materials. In one example, base 108, lid 110, and/or hinge 112 of charging case 100 may include and/or represent at least one type of plastic material that facilitates the passage of wireless communications and/or fails to interfere with such wireless communications. In other words, the plastic material may enable wireless communications to be exchanged between the artificial-reality display and an external device through charging case 100. Additional examples of such materials include, without limitation, ceramics, polymers, metals, composites, woods, foams, injection molding materials, nylons, polycarbonates, combinations or variations of one or more of the same, and/or any other suitable materials.

In some examples, hinge 112 may constitute and/or represent a living hinge built and/or formed from the same material(s) as lid 110 and/or base 108. In such examples, base 108, lid 110, and/or hinge 112 may represent different areas and/or sections of a single unit. In one example, plastic may be a suitable choice for the material out of which base 108, lid 110, and/or hinge 112 are made. In this example, if base 108, lid 110, and/or hinge 112 are made out of plastic, charging case 100 may include and/or provide a transparent area and/or zone for at least one antenna in the artificial-reality display. Such a transparent area and/or zone may enable the antenna in the artificial-reality display to send and/or receive wireless communications through charging case 100.

Figure 3:
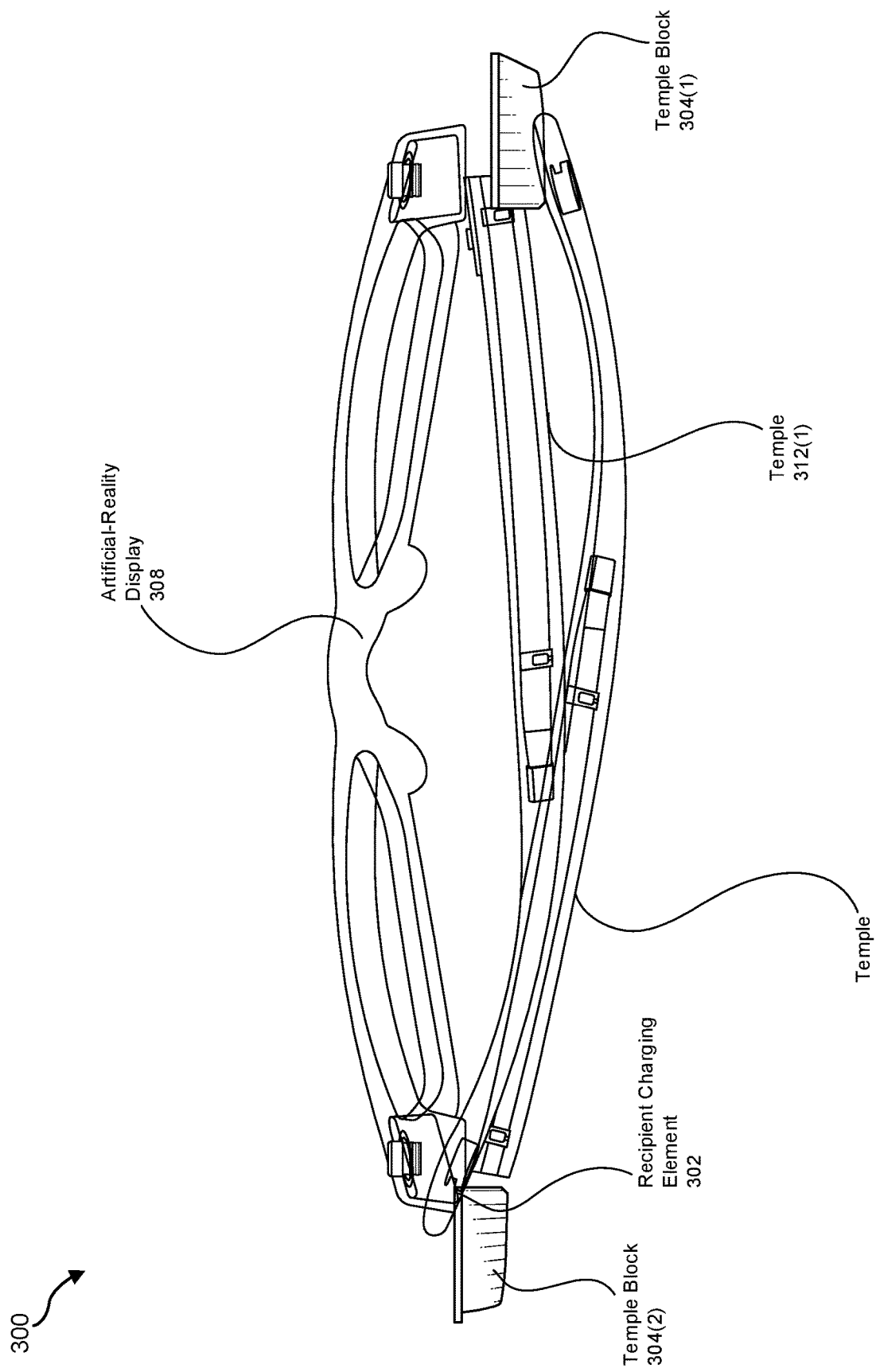
FIG. 3 is an illustration of an exemplary system for charging artificial-reality displays according to one or more embodiments of this disclosure.

FIG. 3 illustrates an exemplary system 300 for charging an artificial-reality display 308. As illustrated in FIG. 3, exemplary system 300 may include and/or represent a set of temple blocks 304(1) and 304(2) on which artificial-reality display 308 rests and/or sits within charging case 100 (not explicitly illustrated in FIG. 3). In some examples, temple blocks 304(1) and 304(2) may constitute and/or represent components or features incorporated into charging case 100. In one example, temple block 304(1) may be passive in that its primary purpose is to support, sustain, and/or position one side of artificial-reality display 308 (at, e.g., the front frame) within charging case 100. In this example, temple block 304(2) may be active in that it incorporates source charging element 102 for charging artificial-reality display 308 in addition to the supporting, sustaining, and/or positioning functionality.

As illustrated in FIG. 3, artificial-reality display 308 may constitute and/or represent a pair of augmented-reality eyeglasses that include temples 312(1) and 312(2). In some examples, temples 312(1) and 312(2) may fold at their respective hinges to enable artificial-reality display 308 to achieve a compact size and/or form factor. In such examples, when temples 312(1) and 312(2) are folded, artificial-reality display 308 may fit properly within charging case 100 and/or rest upon temple blocks 304(1) and 304(2).

In some examples, artificial-reality display 308 may include and/or incorporate a recipient charging element 302 that facilitates charging a battery of artificial-reality display 308. In one example, recipient charging element 302 may be incorporated into artificial-reality display 308 in a way that conceals recipient charging element 302 from view when artificial-reality display 308 is worn by a user. For example, recipient charging element 302 may be situated and/or positioned at the interface between the front frame of artificial-reality display 308 and temple 312(2). In other words, recipient charging element 302 may be situated and/or positioned on one end (at, e.g., a hinge block) of the front frame of artificial-reality display 308 where temple 312(2) is coupled to the front frame via a hinge.

In some examples, the hinge may enable temple 312(2) to fold and/or unfold relative to the front frame of artificial-reality display 308. In one example, if recipient charging element 302 is situated and/or positioned at the end of the front frame where temple 312(2) is attached, recipient charging element 302 may be accessible when temple 312(2) is folded and/or inaccessible when temple 312(2) is unfolded. Additionally or alternatively, recipient charging element 302 may be visible when temple 312(2) is folded and/or may be concealed from view when temple 312(2) is unfolded.

In some examples, temple blocks 304(1) and 304(2) may be fixed at specific locations that enable artificial-reality display 308 to self-center within charging case 100. In other words, the locations and/or dimensions of temple blocks 304(1) and 304(2) may collectively ensure that artificial-reality display 308 falls and/or drops into the correct position for charging irrespective of which of temples 312(1) and 312(2) is folded first or second. For example, if temple 312(2) is folded first and temple 312(1) is folded second, artificial-reality display 308 may fall and/or drop straight into the correct position within charging case 100 without much influence and/or guidance from temple block 304(1) and/or alignment guide 104. However, if temple 312(1) is folded first and temple 312(2) is folded second, artificial-reality display 308 may be obstructed and/or blocked from falling and/or dropping into the correct position without proper guidance from temple block 304(1).

Accordingly, the location and/or dimensions of temple block 304(1) may guide and/or align artificial-reality display 308 into the correct position within charging case 100 even if temple 312(1) is folded first and temple 312(2) is folded second. For example, if temple 312(1) is folded first and temple 312(2) is folded second, artificial-reality display 308 may fall and/or drop such that the end of the front frame near recipient charging element 302 hits temple block 304(2). As the end of the front frame near recipient charging element 302 hits temple block 304(2), this contact may effectively move and/or force artificial-reality display 308 toward temple block 304(1) such that the obstacle that initially prevented recipient charging element 302 from energizingly coupling with source charging element 102 is avoided. In this example, temple block 304(1) may then guide and/or push artificial-reality display 308 back toward temple block 304(2) by gravitational pull. Once artificial-reality display 308 reaches a certain point on the way back toward temple block 304(2), magnetic fasteners (not necessarily illustrated in FIG. 3) may guide and/or pull artificial-reality display 308 into the correct position within charging case 100.

Artificial-reality display 308 may include and/or form any shape suitable for fitting inside charging case 100 and/or resting on temple blocks 304(1) and 304(2). In some examples, artificial-reality display 308 may take the shape of and/or appear similar to eyeglasses and/or spectacles. In addition, artificial-reality display 308 may be of any dimensions suitable for enclosure within charging case 100 and/or spanning across temple blocks 304(1) and 304(2). In one example, artificial-reality display 308 may be dimensioned to avoid contact with base 108 and/or lid 110 of charging case 100. In another example, artificial-reality display 308 may be dimensioned such that lid 110 is able to apply pressure and/or force onto artificial-reality display 308 when enclosed inside charging case 100.

Artificial-reality display 308 may include and/or contain any variety of materials. In one example, the frame of artificial-reality display 308 may include and/or represent at least one type of nylon. Additional examples of such materials include, without limitation, ceramics, polymers, metals, composites, woods, foams, injection molding materials, nylons, polycarbonates, combinations or variations of one or more of the same, and/or any other suitable materials.

In some examples, the frame of artificial-reality display 308 may warp and/or deform over time (due, e.g., to use, wear and tear, and/or exposure to certain conditions or elements). For example, the front frame of artificial-reality display 308 may bow such that its length effectively shrinks. As a result, the front frame of artificial-reality display 308 may fail to span and/or extend across temple blocks 304(1) and 304(2) unless temple block 304(1) is dimensioned and/or positioned to compensate for such warpage and/or deformations.

In one example, temple block 304(1) may include and/or represent a shelf designed to support and/or sustain artificial-reality display 308 despite such warpage and/or deformations. In this example, the shelf may be dimensioned such that artificial-reality display 308 does not fall off temple block 304(1) after artificial-reality display 308 warps or deforms.

Figure 4:
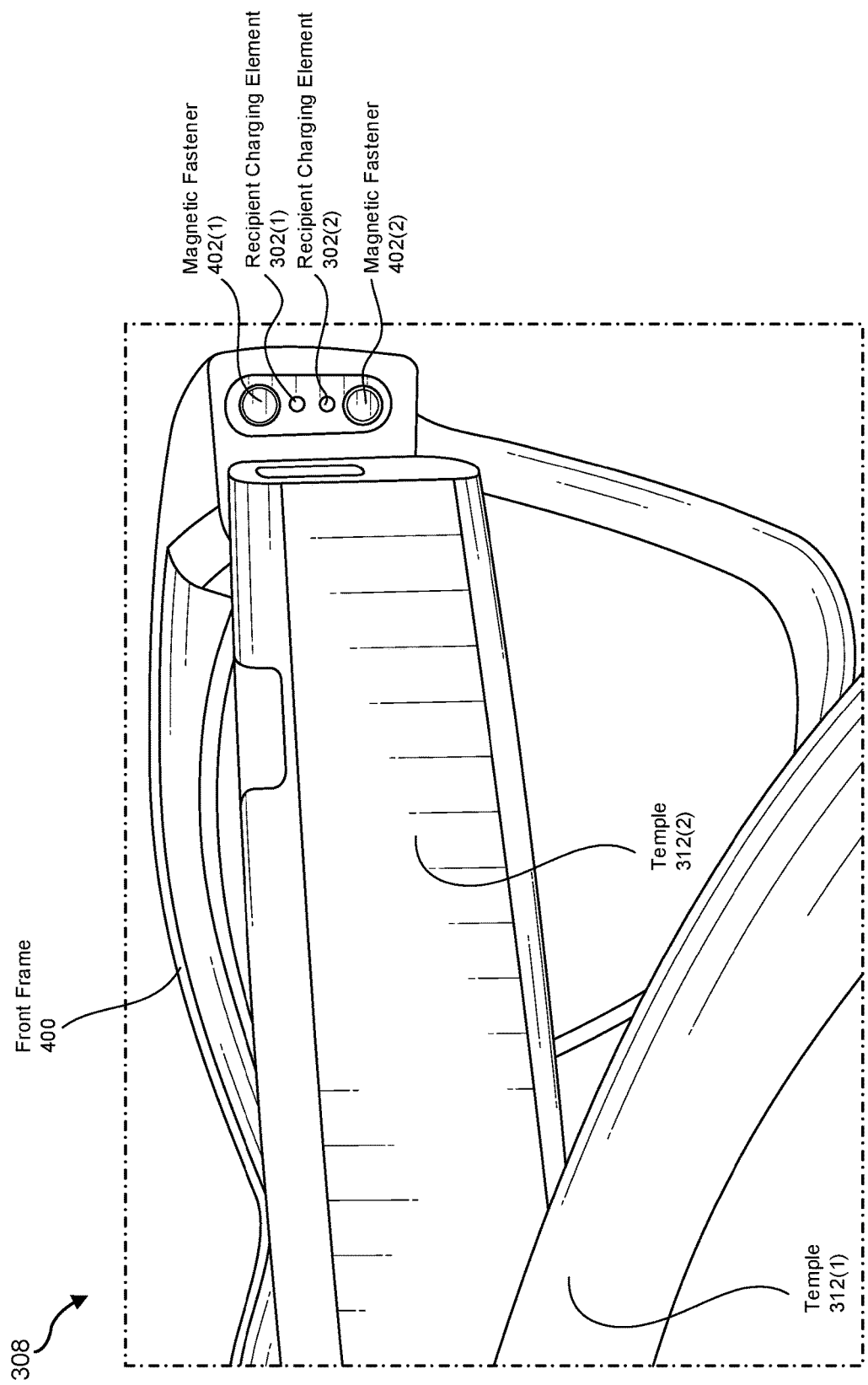
FIG. 4 is an illustration of an exemplary artificial-reality display equipped with certain features that facilitate charging an onboard battery according to one or more embodiments of this disclosure.

FIG. 4 illustrates an exemplary implementation of artificial-reality display 308. As illustrated in FIG. 4, artificial-reality display 308 may include and/or represent temples 312(1) and 312(2) coupled to a front frame 400 via hinges. In some examples, artificial-reality display 308 may include and/or represent magnetic fasteners 402(1) and 402(2) and/or recipient charging elements 302(1) and 302(2). In one example, magnetic fasteners 402(1) and 402(2) and/or recipient charging elements 302(1) and 302(2) may be incorporated into the end of front frame 400 where temple 312(2) is attached. In this example, the positioning of magnetic fasteners 402(1) and 402(2) and/or recipient charging elements 302(1) and 302(2) may enable a user of artificial-reality display 308 to easily access and/or hide magnetic fasteners 402(1) and 402(2) and/or recipient charging elements 302(1) and 302(2) by moving temple 312(2).

In one example, magnetic fasteners 402(1) and 402(2) incorporated into front frame 400 of artificial-reality display 308 may interface with, mate with, and/or engage corresponding magnetic fasteners incorporated into temple block 304(2) of charging case 100. Additionally or alternatively, recipient charging elements 302(1) and 302(2) incorporated into front frame 400 of artificial-reality display 308 may interface with, mate with, and/or engage corresponding source charging elements incorporated into temple block 304(2) of charging case 100.

Figure 5:
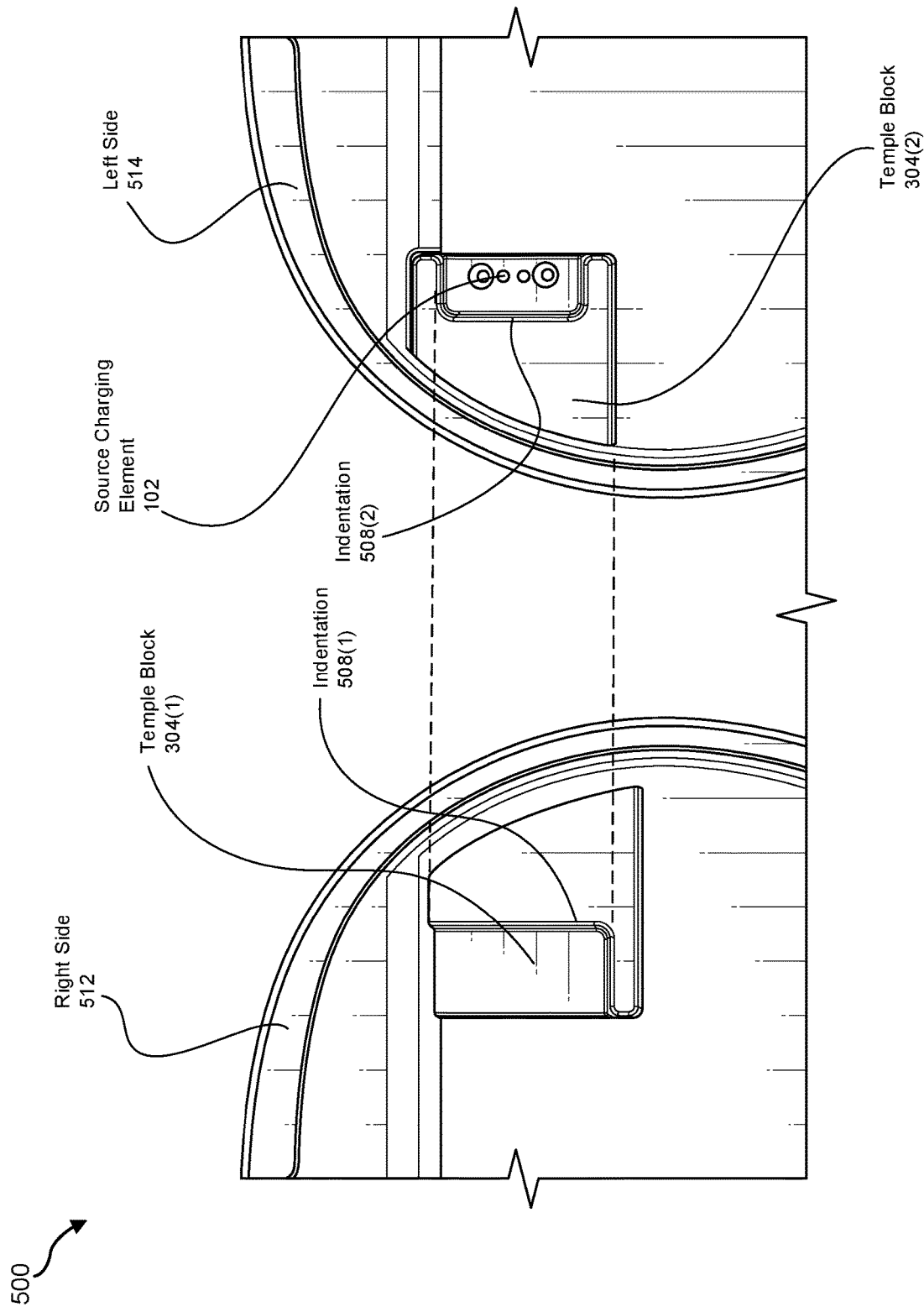
FIG. 5 is a split-view illustration of an exemplary charging case for charging artificial-reality displays according to one or more embodiments of this disclosure.

FIG. 5 illustrates a split view 500 of an exemplary implementation of charging case 100. As illustrated in split view 500 in FIG. 5, the exemplary implementation of charging case 100 may include a left side 514 of base 108 and a right side 512 of base 108. In split view 500 in FIG. 5, left side 514 and right side 512 may be represented and/or shown in opposite positions to demonstrate the intentional offset and/or misalignment of temple blocks 304(1) and 304(2) with respect to one another.

In some examples, the exemplary implementation of charging case 100 may involve temple blocks 304(1) and 304(2) being somewhat offset and/or misaligned with respect to one another inside charging case 100. In one example, temple blocks 304(1) and 304(2) may include and/or form indentations 508(1) and 508(2), respectively, that serve and/or function to direct or guide artificial-reality display 308 into the correct position within charging case 100. Additionally or alternatively, indentations 508(1) and 508(2) may be somewhat offset and/or misaligned with respect to one another inside charging case 100. For example, the top side of indentation 508(2) formed in temple block 304(2) may align with the top side of temple block 304(1) within charging case 100. In this example, the bottom side of temple block 304(2) may align with the bottom side of indentation 508(1) formed in temple block 304(1) within charging case 100.

Figure 6:
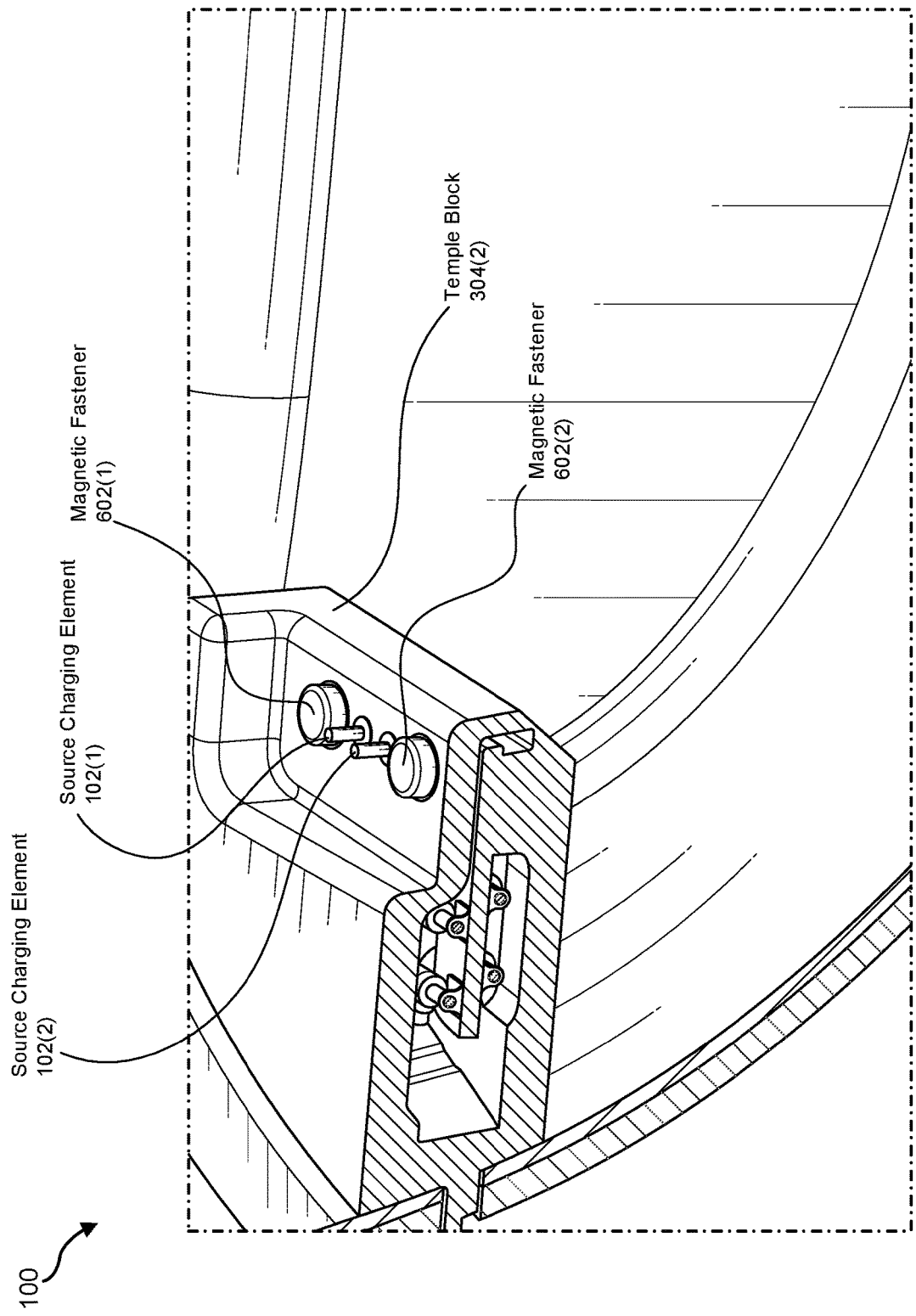
FIG. 6 is an illustration of an exemplary charging case for charging artificial-reality displays according to one or more embodiments of this disclosure.
Figure 7:
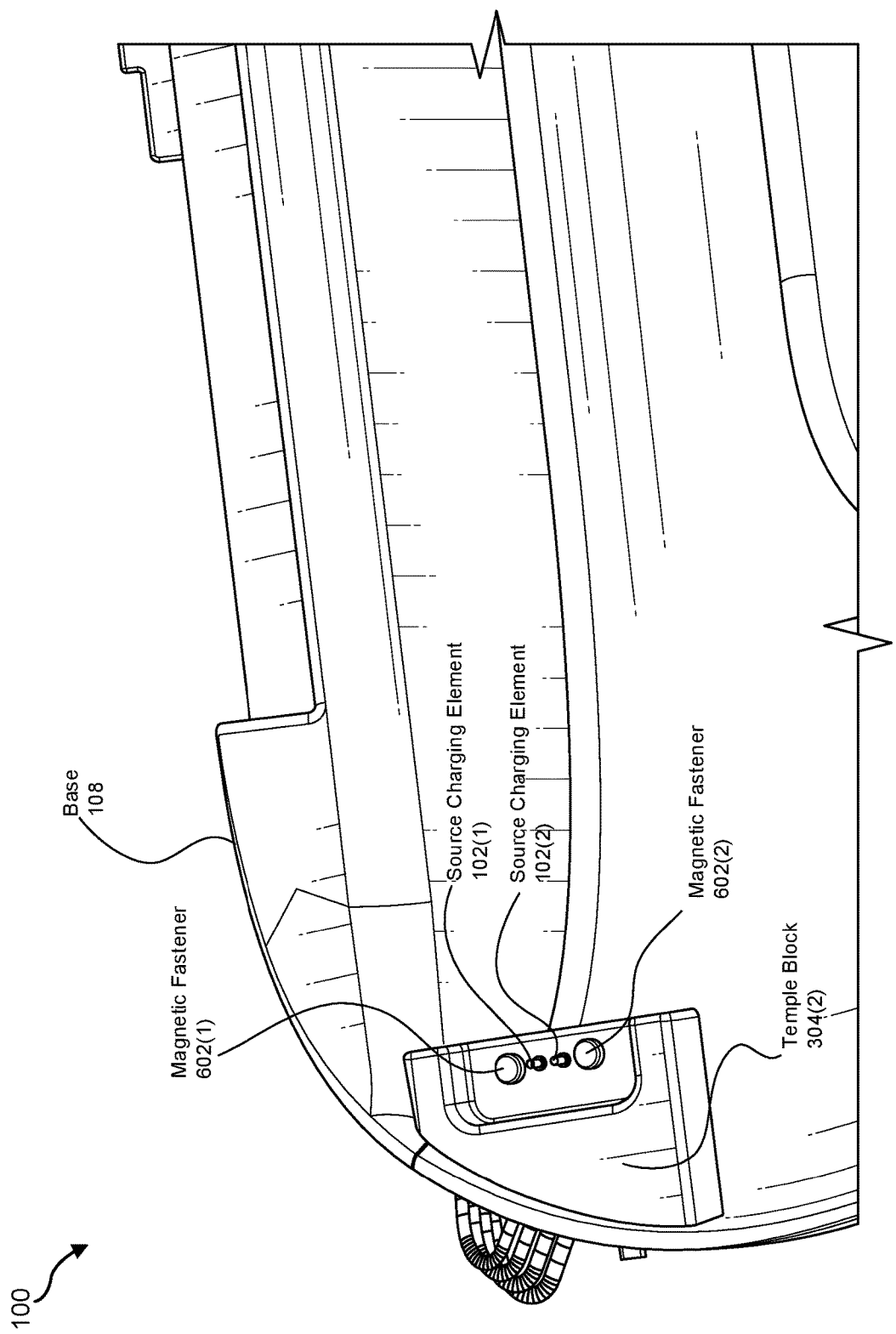
FIG. 7 is an illustration of an exemplary charging case for charging artificial-reality displays according to one or more embodiments of this disclosure.

FIGS. 6 and 7 illustrate an exemplary implementation of charging case 100. As illustrated in FIGS. 6 and 7, charging case 100 may include and/or incorporate magnetic fasteners 502(1) and 502(2) and/or source charging elements 102(1) and 102(2) in temple block 304(2). In one example, magnetic fasteners 402(1) and 402(2) incorporated into front frame 400 of artificial-reality display 308 may interface with, mate with, and/or engage magnetic fasteners 502(1) and 502(2) incorporated into temple block 304(2). By doing so, these magnetic fasteners may secure and/or fix artificial-reality display 308 in place within charging case 100. As a result of artificial-reality display 308 being secured and/or fixed in place within charging case 100, recipient charging elements 302(1) and 302(2) incorporated into artificial-reality display 308 may establish and/or maintain electrical continuity with source charging elements 102(1) and 102(2), respectively, in temple block 304(2) even if charging case 100 is subjected to one or more jolts and/or external forces.

Figure 8:
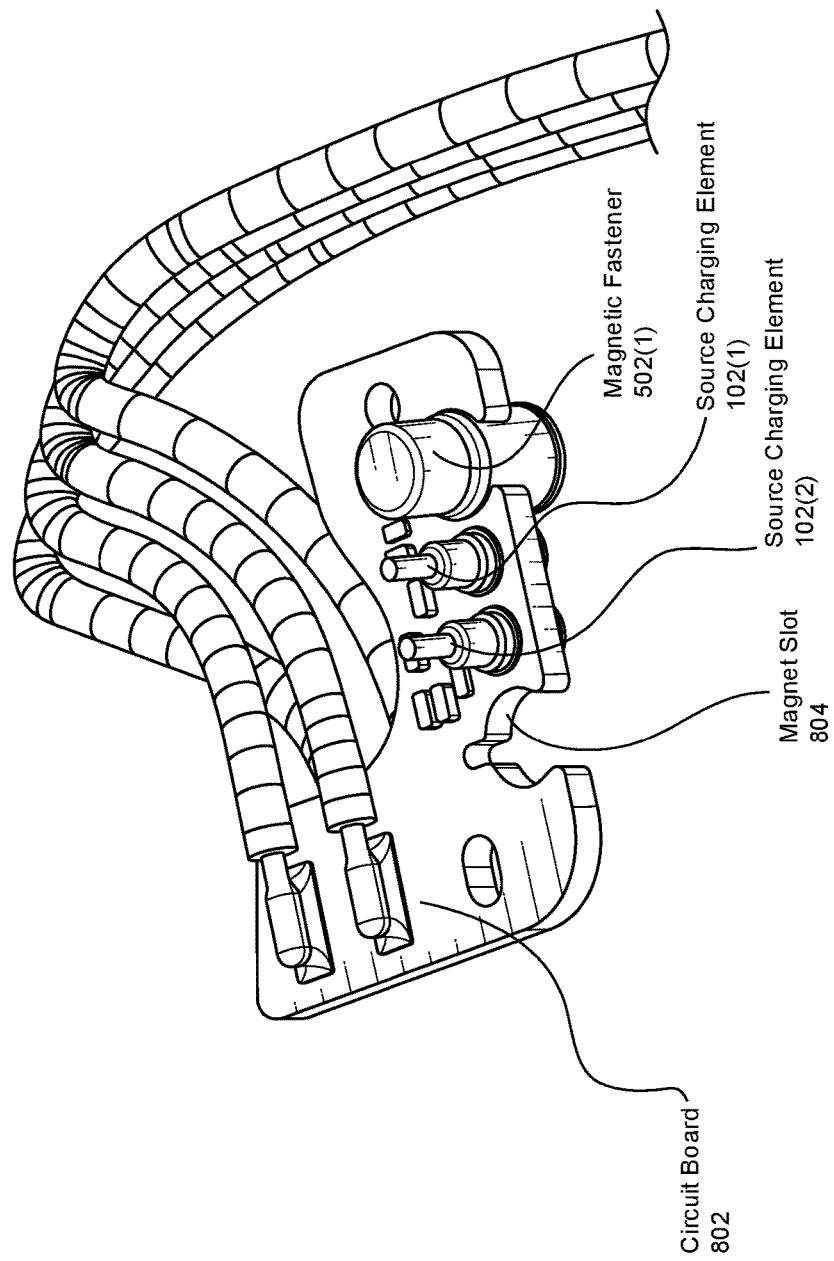
FIG. 8 is an illustration of an exemplary module that facilitates charging artificial-reality displays according to one or more embodiments of this disclosure.

FIG. 8 illustrates exemplary module 800 that facilitates charging artificial-reality display 308 within charging case 100. As illustrated in FIG. 8, module 800 may include and/or represent a circuit board 802 that accommodates magnetic fasteners 502(1) and 502(2) and/or source charging elements 102(1) and 102(2). In some examples, circuit board 802 may include and/or form a magnet slot 804 dimensioned to mount magnetic fastener 502(2). In such examples, circuit board 802 may also include and/or form another magnet slot (not explicitly labelled in FIG. 8) dimensioned to mount magnetic fastener 502(1). Circuit board 802 may be incorporated and/or secured within temple block 304(2) of charging case 100.

In one example, the mounting of magnetic fastener 502(2) within magnet slot 804 may be achieved and/or accomplished via a press fit, interference fit, friction fit, and/or compression fit. Additionally or alternatively, magnet slot 804 may be plated, and an electrically conductive adhesive (e.g., a conductive epoxy or glue) may be applied to reinforce the hold on magnetic fastener 502(2) within magnet slot 804. In this example, the plating on magnet slot 804 and/or the other plating may enable charging case 100 to communicate with artificial-reality display 308 and/or vice versa. For example, circuit board 802 may pass and/or feed one or more communication signals to artificial-reality display 308 via magnetic fasteners 502(1) and 502(2) incorporated into charging case 100 and magnetic fasteners 402(1) and 402(2) incorporated into artificial-reality display 308. Accordingly, magnetic fasteners 502(1) and 502(2) incorporated into charging case 100 and magnetic fasteners 402(1) and 402(2) incorporated into artificial-reality display 308 may form and/or represent part of a communication bus, such as a Serial Peripheral Interface (SPI) bus and/or an Inter-Integrated Circuit (I²C) bus, that runs and/or spans across charging case 100 and/or artificial-reality display 308.

Figure 9:
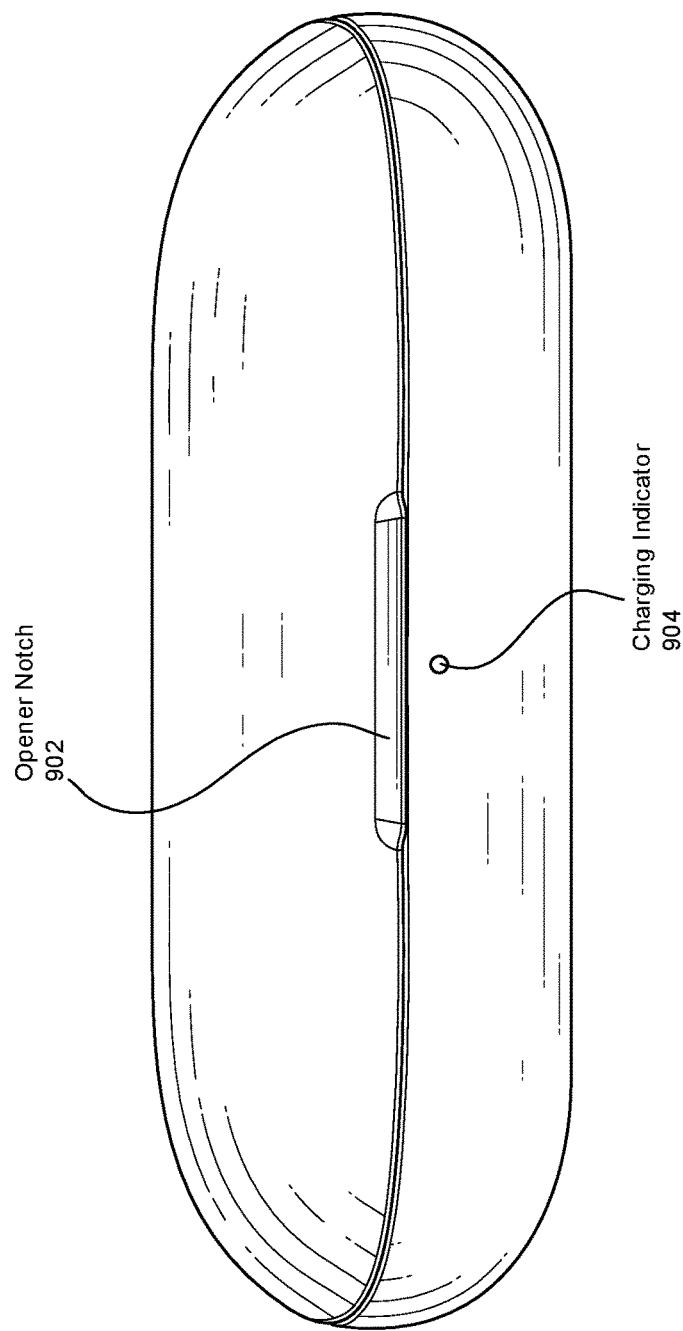
FIG. 9 is an illustration of an exemplary charging case for charging artificial-reality displays according to one or more embodiments of this disclosure.
Figure 10:
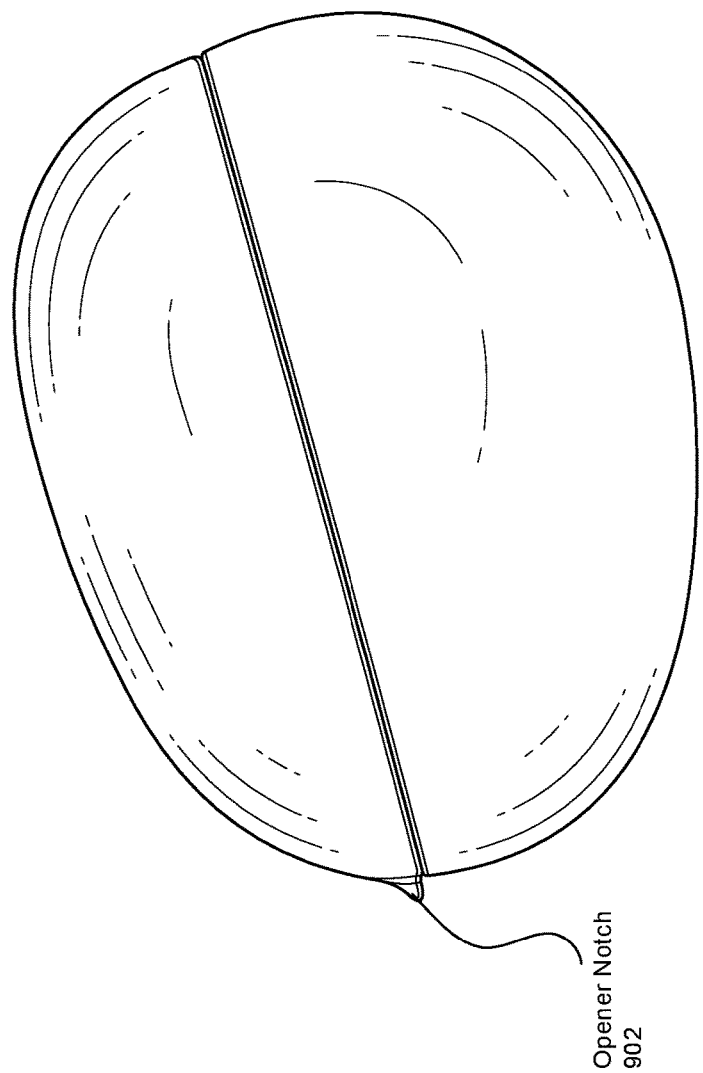
FIG. 10 is an illustration of an exemplary charging case for charging artificial-reality displays according to one or more embodiments of this disclosure.
Figure 11:
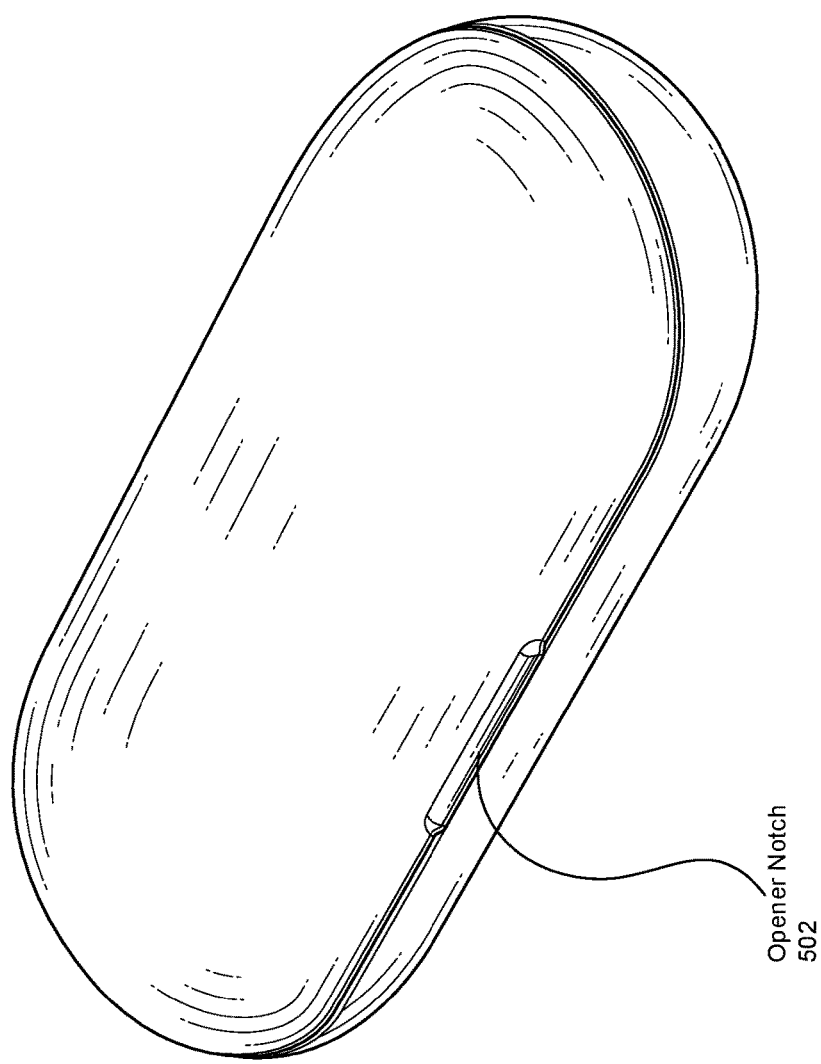
FIG. 11 is an illustration of an exemplary charging case for charging artificial-reality displays according to one or more embodiments of this disclosure.

FIGS. 9, 10, and 11 illustrate an exemplary implementation of charging case 100 when lid 110 is closed and/or shut to base 108. As illustrated in FIGS. 9, 10, and 11, exemplary charging case 100 may include and/or incorporate an opener notch 902 and/or a charging indicator 904. In one example, opener notch 902 may include and/or represent a mechanical member, extension, and/or feature that facilitates opening lid 110 from a closed position. Additionally or alternatively, charging indicator 904 may include and/or represent a light (such as a light-emitting diode) that illuminates in one way or another to indicate the charging status of artificial-reality display 308 within charging case 100.

Figure 12:
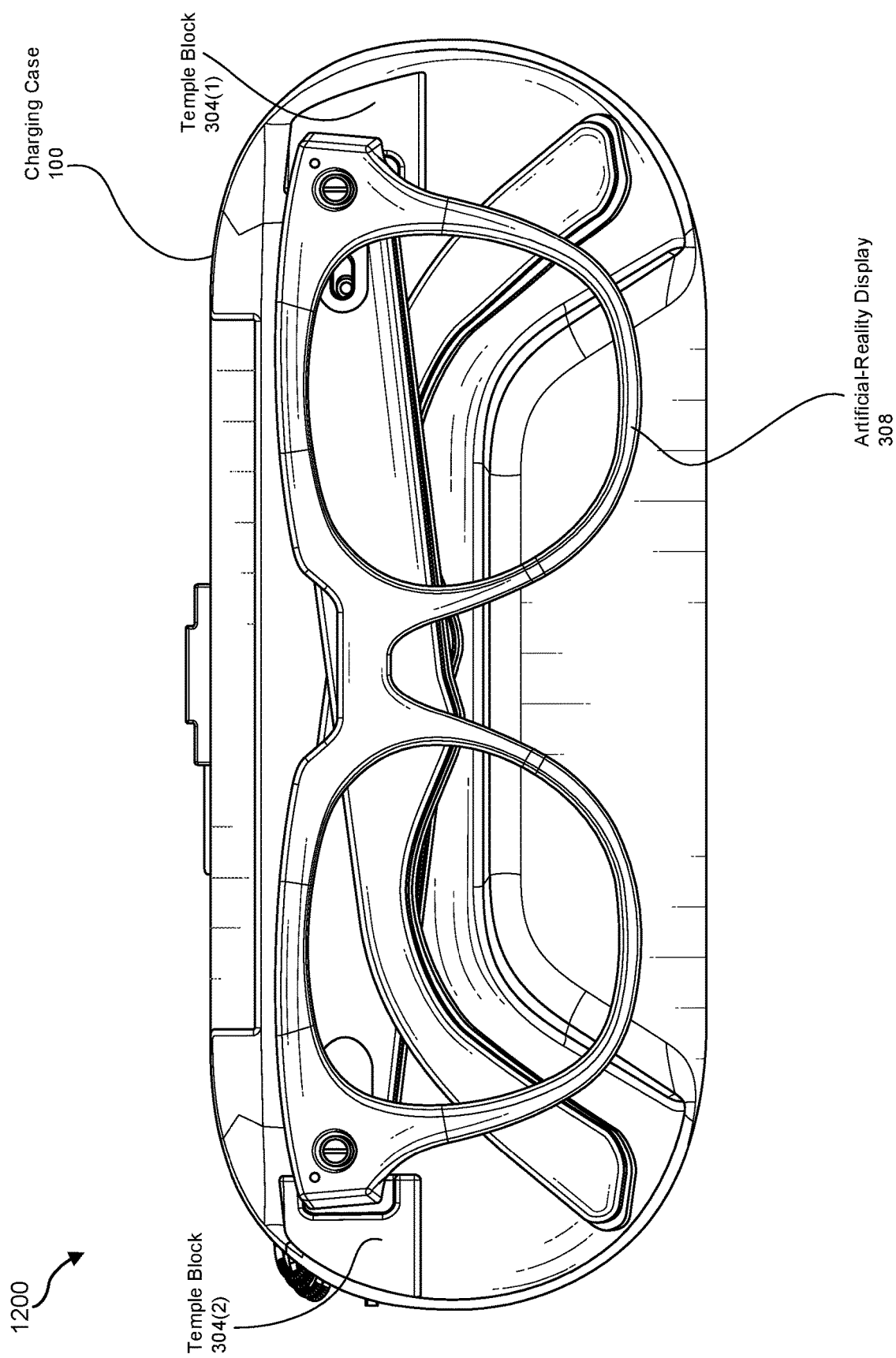
FIG. 12 is an illustration of an exemplary system for charging artificial-reality displays according to one or more embodiments of this disclosure.
Figure 13:
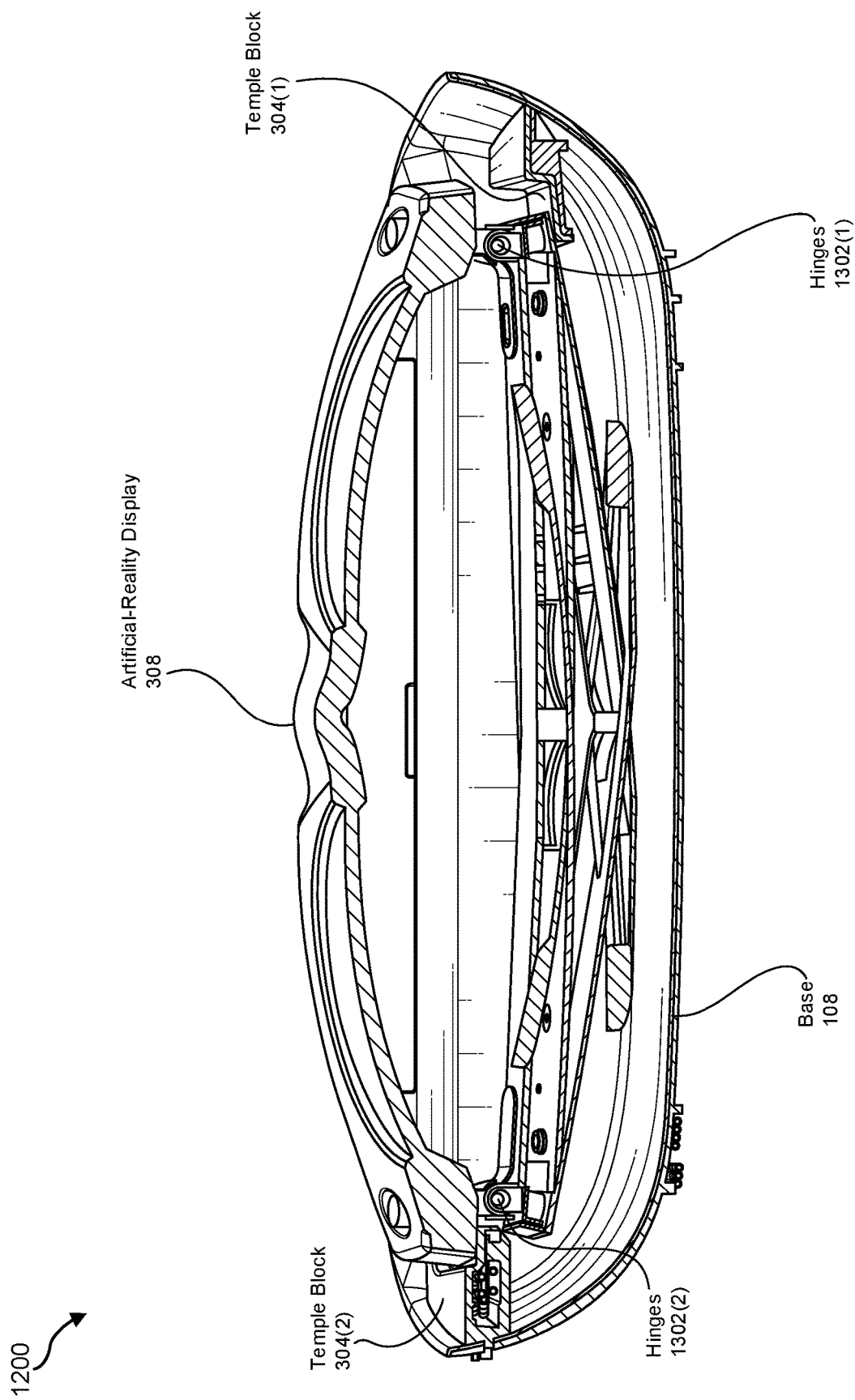
FIG. 13 is an illustration of an exemplary system for charging artificial-reality displays according to one or more embodiments of this disclosure.

FIGS. 12 and 13 illustrate an exemplary system 1200 that includes artificial-reality display 308 and charging case 100. As illustrated in FIGS. 12 and 13, artificial-reality display 308 may be placed inside charging case 100 when temples 312(1) and 312(2) are folded via hinges 1302(1) and 1302(2), respectively. In this placement, artificial-reality display 308 may sit and/or rest upon temple blocks 304(1) and 304(2) within charging case 100.

In some examples, artificial-reality display 308 may charge its battery via an electrical coupling between recipient charging element 302 and source charging element 102. In one example, charging case 100 may be designed to maintain artificial-reality display 308 in a level position with support from temple blocks 304(1) and 304(2). In this example, temple blocks 304(1) and 304(2) may be positioned and/or offset at different heights relative to one another within charging case 100. For example, and as illustrated in FIG. 13, temple block 304(2) may be positioned higher than temple block 304(1) within charging case 100. In this example, the height difference between temple blocks 304(1) and 304(2) may be attributed to their different targets of support.

In one example, temple block 304(1) may be designed to interface with and/or support temple 312(1) of artificial-reality display 308. In this example, temple block 304(2) may be designed to interface with and/or support front frame 400 of artificial-reality display 308 (at, e.g., a hinge block).

In one example, temple block 304(1) may be shaped with a gradient, slope, and/or incline that continues supporting artificial-reality display 308 even after artificial-reality display 308 has warped and/or deformed from its original and/or pristine state. In this example, the gradient, slope, and/or incline of temple block 304(1) may also serve to maintain artificial-reality display 308 in a level position within charging case 100 despite such warpage and/or deformations.

Figure 14:
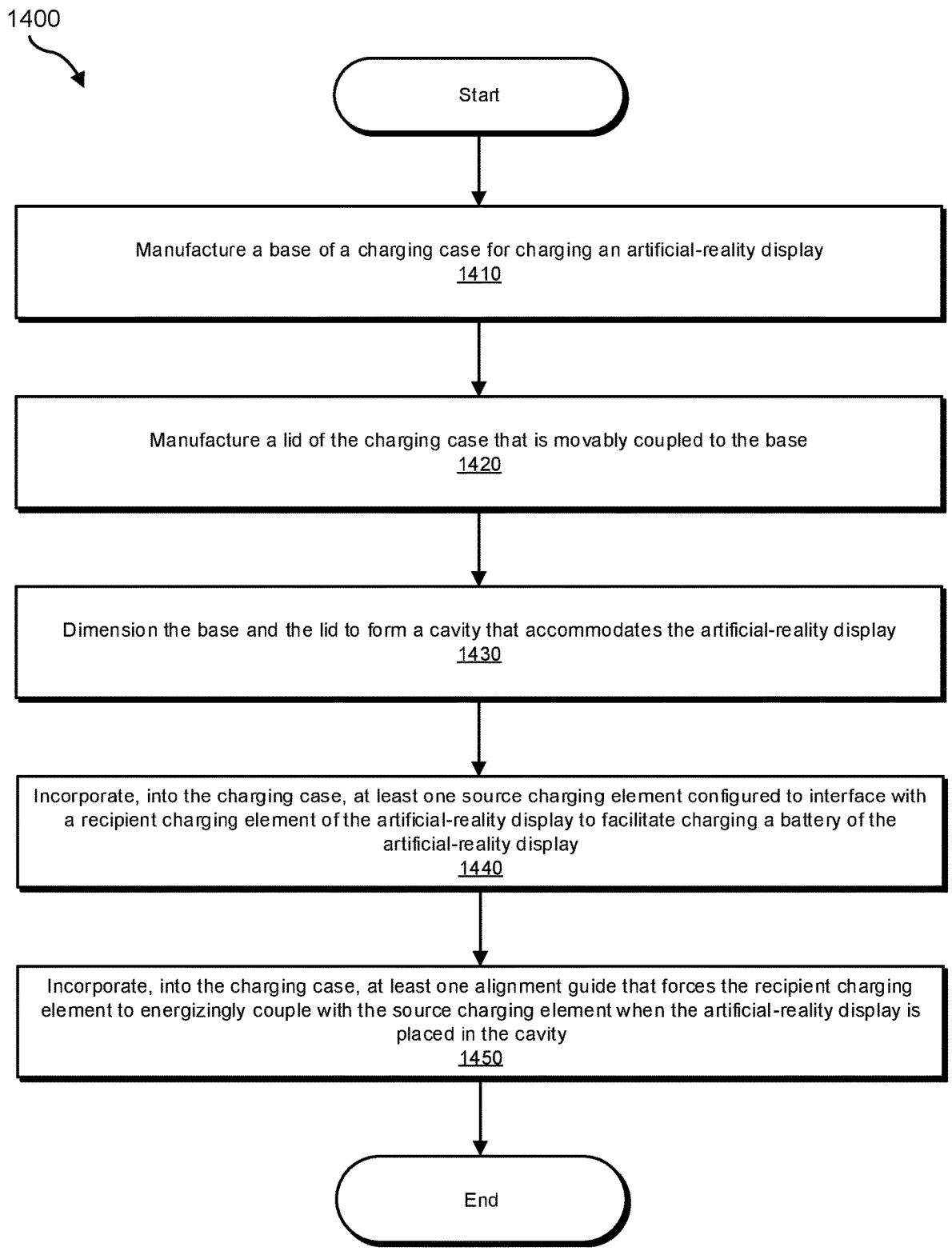
FIG. 14 is a flowchart of an exemplary method for charging artificial-reality displays.

FIG. 14 is a flow diagram of an exemplary method 1400 for manufacturing and/or assembling a charging case that facilitates charging artificial-reality displays. Method 1400 may include the step of manufacturing a base of a charging case that facilitates charging artificial-reality displays (1410). Step 1410 may be performed in a variety of ways, including any of those described above in connection with FIGS. 1-13. For example, a computing equipment manufacturer or subcontractor may manufacture and/or produce a base of a charging case. In this example, the charging case may be designed and/or configured to charge an artificial-reality display.

Method 1400 may also include the step of manufacturing a lid of the charging case that is movably coupled to the base (1420). Step 1420 may be performed in a variety of ways, including any of those described above in connection with FIGS. 1-13. For example, the computing equipment manufacturer or subcontractor may manufacture and/or produce a lid of the charging case. In this example, the lid of the charging case may be movably coupled to the base of the charging case via a hinge (e.g., a living hinge).

Method 1400 may further include the step of dimensioning the base and the lid to form a cavity that accommodates the artificial-reality display (1430). Step 1430 may be performed in a variety of ways, including any of those described above in connection with FIGS. 1-13. For example, the computing equipment manufacturer or subcontractor may dimension and/or design the base and the lid to form a cavity that accommodates the artificial-reality display.

Method 1400 may additionally include the step of incorporating, into the charging case, at least one source charging element configured to interface with a recipient charging element of the artificial-reality display to facilitate charging a battery of the artificial-reality display (1440). Step 1440 may be performed in a variety of ways, including any of those described above in connection with FIGS. 1-13. For example, the computing equipment manufacturer or subcontractor may incorporate at least one source charging element into the base of the charging case. In this example, the source charging element may be configured to interface with a recipient charging element of the artificial-reality display to facilitate charging a battery of the artificial-reality display.

Finally, method 1400 may include the step of incorporating, into the charging case, at least one alignment guide that forces the recipient charging element to energizingly couple with the source charging element when the artificial-reality display is placed in the cavity (1450). Step 1450 may be performed in a variety of ways, including any of those described above in connection with FIGS. 1-13. For example, the computing equipment manufacturer or subcontractor may incorporate at least one alignment guide into the charging case. In this example, the alignment guide may force the recipient charging element to energizingly couple with the source charging element when the artificial-reality display is placed in the cavity.

EXAMPLE EMBODIMENTS

Example 1: A system may comprise (1) an artificial-reality display dimensioned to be worn by a user, the artificial-reality display comprising (A) a battery and (B) at least one recipient charging element, and (2) a charging case dimensioned to accommodate the artificial-reality display, the charging case comprising (A) at least one source charging element configured to interface with the recipient charging element of the artificial-reality display to facilitate charging the battery of the artificial-reality display and (B) at least one alignment guide that forces the recipient charging element of the artificial-reality display to energizingly couple with the source charging element of the charging case.

Example 2: The system of Example 1, wherein the alignment guide of the charging case is positioned to align the recipient charging element of the artificial-reality display with the source charging element when the artificial-reality display is placed within the charging case.

Example 3: The system of either of Examples 1 and 2, wherein the alignment guide of the charging case secures the artificial-reality display in a specific position that ensures continuity of the energizing coupling between the recipient charging element and the source charging element when the artificial-reality display is enclosed within the charging case.

Example 4: The system of any of Examples 1-3, wherein (1) the artificial-reality display comprises augmented-reality glasses having a set of temples, (2) the charging case comprises one or more temple blocks positioned to support one or more of the temples of the augmented-reality glasses, and (3) the alignment guide of the charging case comprise one or more indentations formed in the temple blocks, the indentations being positioned to hold the augmented-reality glasses in the specific position within the charging case.

Example 5: The system of any of Examples 1-4, wherein the alignment guide of the charging case comprise one or more mechanical pins positioned to hold the artificial-reality display in the specific position within the charging case.

Example 6: The system of any of Examples 1-5, wherein the alignment guide of the charging case comprise one or more magnetic fasteners positioned to hold the artificial-reality display in the specific position within the charging case.

Example 7: The system of any of Examples 1-6, wherein the alignment guide of the charging case comprises a cavity dimensioned to force the artificial-reality display into a specific position that ensures continuity of the energizing coupling between the recipient charging element and the source charging element upon closure of the charging case.

Example 8: The system of any of Examples 1-7, wherein (1) the charging case has a lid that movably closes via a hinge, and (2) the cavity of the charging case is dimensioned such that the lid applies pressure on the artificial-reality display when the lid is movably closed onto the artificial-reality display via the hinge, the pressure applied by the lid serving to secure continuity of the energizing coupling between the recipient charging element and the source charging element.

Example 9: The system of any of Examples 1-8, wherein (1) the charging case charges the battery of the artificial-reality display, and (2) the alignment guide of the charging case prevents the recipient charging element from disengaging from the source charging element despite a jolt experienced by the charging case.

Example 10: The system of any of Examples 1-9, wherein (1) the artificial-reality display comprises augmented-reality glasses having a set of temples, and (2) the charging case comprises at least one temple block that (A) is positioned to support the at least one of the temples of the augmented-reality glasses and (B) incorporates the source charging element to facilitate charging the battery via the recipient charging element when the at least one of the temples of the augmented-reality glasses is supported by the temple block.

Example 11: The system of any of Examples 1-10, wherein (1) the augmented-reality glasses have a front frame, (2) the recipient charging element is situated on an end of the front frame of the augmented-reality glasses, and (3) one of the temples is coupled to the end of the front frame of the augmented-reality glasses via a hinge such that the recipient charging element is accessible when the one of the temples is folded and inaccessible when the one of the temples is unfolded.

Example 12: The system of any of Examples 1-11, wherein the recipient charging element is visible when the one of the temples is folded and is concealed from view when the one of the temples is unfolded.

Example 13: The system of any of Examples 1-12, wherein (1) the energizing coupling comprises an electrical coupling between the recipient charging element and the source charging element, and (2) the recipient charging element and the source charging element comprise electrical connectors that are configured to mate with each other and facilitate charging the battery of the artificial-reality display via the electrical coupling.

Example 14: The system of any of Examples 1-13, wherein (1) the energizing coupling comprises an inductive coupling between the recipient charging element and the source charging element, and (2) the recipient charging element and the source charging element comprise electromagnetic coils that are configured to induce an electromotive force that facilitates charging the battery of the artificial-reality display via the inductive coupling.

Example 15: The system of any of Examples 1-14, wherein the charging case comprises an additional battery that transfers power to the battery of the artificial-reality display via the energizing coupling between the source charging element and the recipient charging element.

Example 16: A charging case for augmented-reality glasses may comprise (1) a base, (2) a lid movably coupled to the base, (3) a cavity that is formed by the base and the lid, the cavity being dimensioned to accommodate the augmented-reality glasses, (4) at least one source charging element configured to interface with a recipient charging element of the augmented-reality glasses to facilitate charging a battery of the artificial-reality display, and (5) at least one alignment guide that forces the recipient charging element of the augmented-reality glasses to energizingly couple with the source charging element when the augmented-reality glasses are placed in the cavity and the lid is closed to the base.

Example 17: The charging case of Example 16, wherein the alignment guide of the charging case is positioned to align the recipient charging element of the artificial-reality display with the source charging element when the artificial-reality display is placed within the charging case.

Example 18: The charging case of either of Examples 16 or 17, wherein the alignment guide of the charging case secures the artificial-reality display in a specific position that ensures continuity of the energizing coupling between the recipient charging element and the source charging element when the artificial-reality display is enclosed within the charging case.

Example 19: The charging case of any of Examples 16-18, further comprising at least one temple block positioned to support at least one temple of the augmented-reality glasses, and wherein the alignment guide of the charging case comprise one or more indentations formed in the temple blocks, the indentations being positioned to hold the augmented-reality glasses in the specific position within the charging case.

Example 20: A method may comprise (1) manufacturing a base of a charging case for charging an artificial-reality display, (2) manufacturing a lid of the charging case that is movably coupled to the base, (3) dimensioning the base and the lid to form a cavity that accommodates the artificial-reality display, (4) incorporating, into the charging case, at least one source charging element configured to interface with a recipient charging element of the artificial-reality display to facilitate charging a battery of the artificial-reality display, and (5) incorporating, into the charging case, at least one alignment guide that forces the recipient charging element of the artificial-reality display to energizingly couple with the source charging element of the artificial-reality display when the artificial-reality display is placed in the cavity.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1500 in FIG. 15) or that visually immerses a user in an artificial reality (such as, e.g., virtual-reality system 1600 in FIG. 16). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 15:
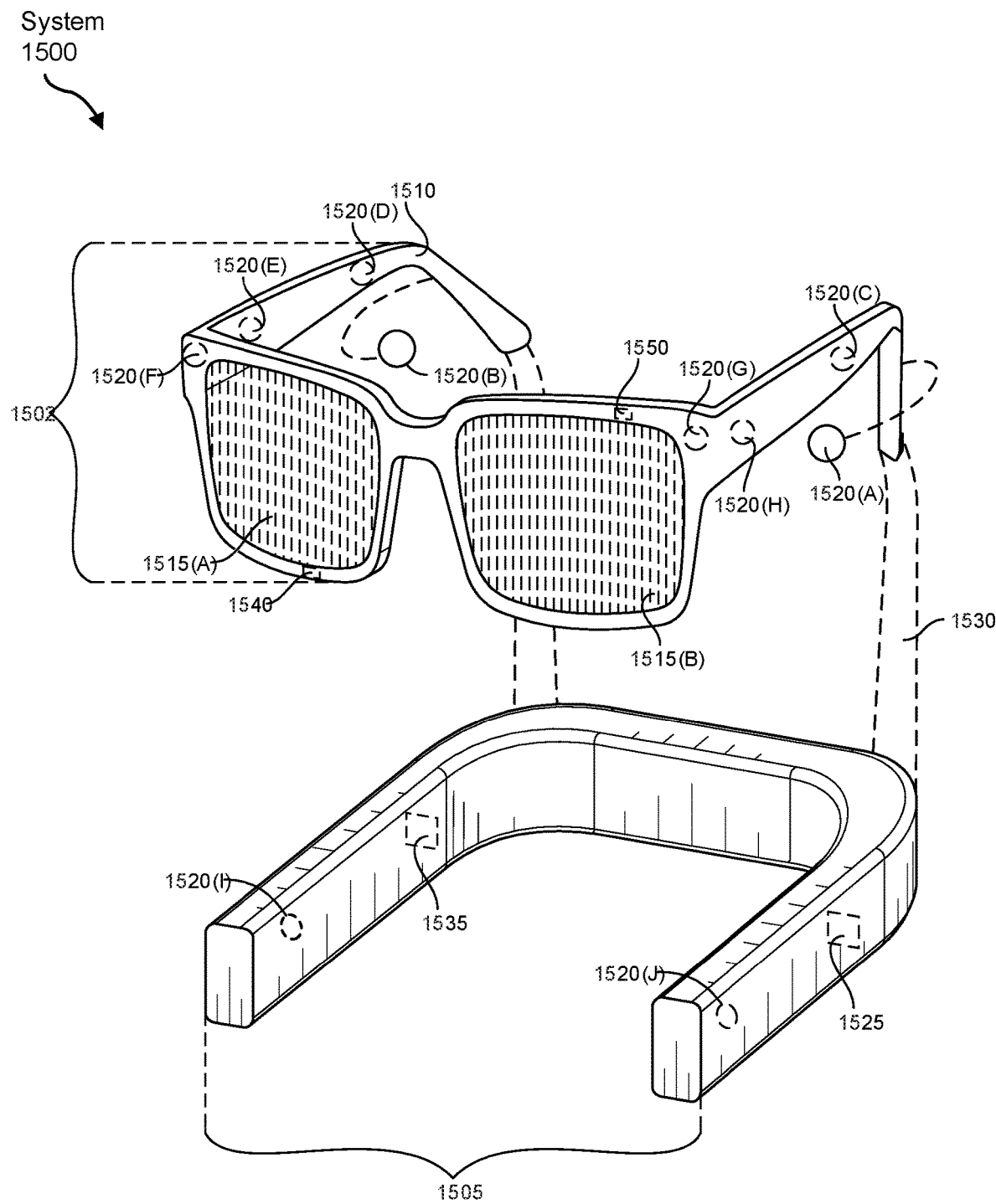
FIG. 15 is an illustration of exemplary augmented-reality glasses that may be used in connection with embodiments of this disclosure.
Figure 16:
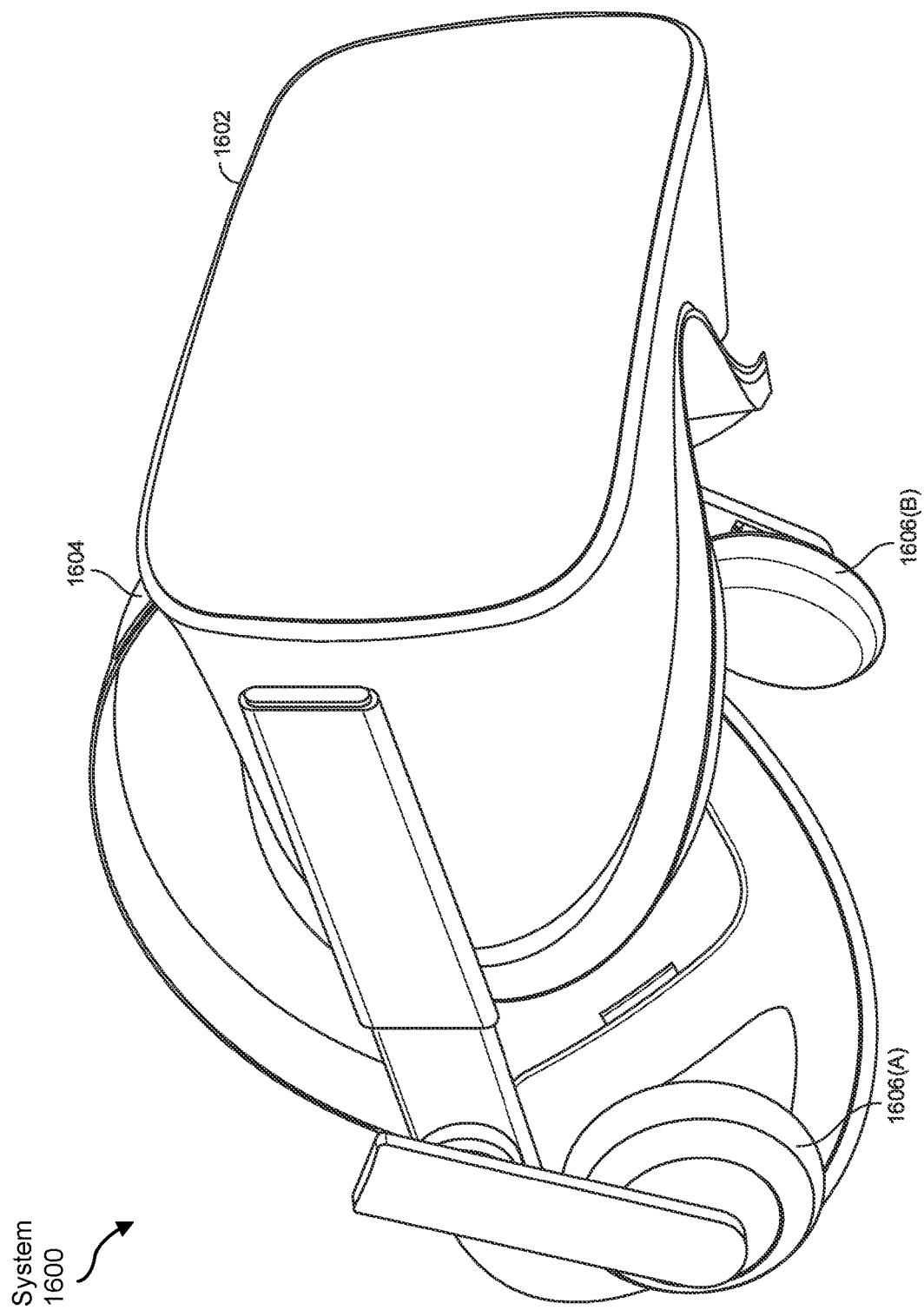
FIG. 16 is an illustration of an exemplary virtual-reality headset that may be used in connection with embodiments of this disclosure.

Turning to FIG. 15, augmented-reality system 1500 may include an eyewear device 1502 with a frame 1510 configured to hold a left display device 1515(A) and a right display device 1515(B) in front of a user's eyes. Display devices 1515(A) and 1515(B) may act together or independently to present an image or series of images to a user. While augmented-reality system 1500 includes two displays, embodiments of this disclosure may be implemented in augmented-reality systems with a single NED or more than two NEDs.

In some embodiments, augmented-reality system 1500 may include one or more sensors, such as sensor 1540. Sensor 1540 may generate measurement signals in response to motion of augmented-reality system 1500 and may be located on substantially any portion of frame 1510. Sensor 1540 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1500 may or may not include sensor 1540 or may include more than one sensor. In embodiments in which sensor 1540 includes an IMU, the IMU may generate calibration data based on measurement signals from sensor 1540. Examples of sensor 1540 may include, without limitation, accelerometers, gyroscopes, magnetometers, other suitable types of sensors that detect motion, sensors used for error correction of the IMU, or some combination thereof.

In some examples, augmented-reality system 1500 may also include a microphone array with a plurality of acoustic transducers 1520(A)-1520(J), referred to collectively as acoustic transducers 1520. Acoustic transducers 1520 may represent transducers that detect air pressure variations induced by sound waves. Each acoustic transducer 1520 may be configured to detect sound and convert the detected sound into an electronic format (e.g., an analog or digital format). The microphone array in FIG. 15 may include, for example, ten acoustic transducers: 1520(A) and 1520(B), which may be designed to be placed inside a corresponding ear of the user, acoustic transducers 1520(C), 1520(D), 1520(E), 1520(F), 1520(G), and 1520(H), which may be positioned at various locations on frame 1510, and/or acoustic transducers 1520(I) and 1520(J), which may be positioned on a corresponding neckband 1505.

In some embodiments, one or more of acoustic transducers 1520(A)-(J) may be used as output transducers (e.g., speakers). For example, acoustic transducers 1520(A) and/or 1520(B) may be earbuds or any other suitable type of headphone or speaker.

The configuration of acoustic transducers 1520 of the microphone array may vary. While augmented-reality system 1500 is shown in FIG. 15 as having ten acoustic transducers 1520, the number of acoustic transducers 1520 may be greater or less than ten. In some embodiments, using higher numbers of acoustic transducers 1520 may increase the amount of audio information collected and/or the sensitivity and accuracy of the audio information. In contrast, using a lower number of acoustic transducers 1520 may decrease the computing power required by an associated controller 1550 to process the collected audio information. In addition, the position of each acoustic transducer 1520 of the microphone array may vary. For example, the position of an acoustic transducer 1520 may include a defined position on the user, a defined coordinate on frame 1510, an orientation associated with each acoustic transducer 1520, or some combination thereof.

Acoustic transducers 1520(A) and 1520(B) may be positioned on different parts of the user's ear, such as behind the pinna, behind the tragus, and/or within the auricle or fossa. Or, there may be additional acoustic transducers 1520 on or surrounding the ear in addition to acoustic transducers 1520 inside the ear canal. Having an acoustic transducer 1520 positioned next to an ear canal of a user may enable the microphone array to collect information on how sounds arrive at the ear canal. By positioning at least two of acoustic transducers 1520 on either side of a user's head (e.g., as binaural microphones), augmented-reality device 1500 may simulate binaural hearing and capture a 3D stereo sound field around about a user's head. In some embodiments, acoustic transducers 1520(A) and 1520(B) may be connected to augmented-reality system 1500 via a wired connection 1530, and in other embodiments acoustic transducers 1520(A) and 1520(B) may be connected to augmented-reality system 1500 via a wireless connection (e.g., a Bluetooth connection). In still other embodiments, acoustic transducers 1520(A) and 1520(B) may not be used at all in conjunction with augmented-reality system 1500.

Acoustic transducers 1520 on frame 1510 may be positioned in a variety of different ways, including along the length of the temples, across the bridge, above or below display devices 1515(A) and 1515(B), or some combination thereof. Acoustic transducers 1520 may also be oriented such that the microphone array is able to detect sounds in a wide range of directions surrounding the user wearing the augmented-reality system 1500. In some embodiments, an optimization process may be performed during manufacturing of augmented-reality system 1500 to determine relative positioning of each acoustic transducer 1520 in the microphone array.

In some examples, augmented-reality system 1500 may include or be connected to an external device (e.g., a paired device), such as neckband 1505. Neckband 1505 generally represents any type or form of paired device. Thus, the following discussion of neckband 1505 may also apply to various other paired devices, such as charging cases, smart watches, smart phones, wrist bands, other wearable devices, hand-held controllers, tablet computers, laptop computers, other external compute devices, etc.

As shown, neckband 1505 may be coupled to eyewear device 1502 via one or more connectors. The connectors may be wired or wireless and may include electrical and/or non-electrical (e.g., structural) components. In some cases, eyewear device 1502 and neckband 1505 may operate independently without any wired or wireless connection between them. While FIG. 15 illustrates the components of eyewear device 1502 and neckband 1505 in example locations on eyewear device 1502 and neckband 1505, the components may be located elsewhere and/or distributed differently on eyewear device 1502 and/or neckband 1505. In some embodiments, the components of eyewear device 1502 and neckband 1505 may be located on one or more additional peripheral devices paired with eyewear device 1502, neckband 1505, or some combination thereof.

Pairing external devices, such as neckband 1505, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1500 may be provided by a paired device or shared between a paired device and an eyewear device, thus reducing the weight, heat profile, and form factor of the eyewear device overall while still retaining desired functionality. For example, neckband 1505 may allow components that would otherwise be included on an eyewear device to be included in neckband 1505 since users may tolerate a heavier weight load on their shoulders than they would tolerate on their heads. Neckband 1505 may also have a larger surface area over which to diffuse and disperse heat to the ambient environment. Thus, neckband 1505 may allow for greater battery and computation capacity than might otherwise have been possible on a stand-alone eyewear device. Since weight carried in neckband 1505 may be less invasive to a user than weight carried in eyewear device 1502, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1505 may be communicatively coupled with eyewear device 1502 and/or to other devices. These other devices may provide certain functions (e.g., tracking, localizing, depth mapping, processing, storage, etc.) to augmented-reality system 1500. In the embodiment of FIG. 15, neckband 1505 may include two acoustic transducers (e.g., 1520(I) and 1520(J)) that are part of the microphone array (or potentially form their own microphone subarray). Neckband 1505 may also include a controller 1525 and a power source 1535.

Acoustic transducers 1520(I) and 1520(J) of neckband 1505 may be configured to detect sound and convert the detected sound into an electronic format (analog or digital). In the embodiment of FIG. 15, acoustic transducers 1520(I) and 1520(J) may be positioned on neckband 1505, thereby increasing the distance between the neckband acoustic transducers 1520(I) and 1520(J) and other acoustic transducers 1520 positioned on eyewear device 1502. In some cases, increasing the distance between acoustic transducers 1520 of the microphone array may improve the accuracy of beamforming performed via the microphone array. For example, if a sound is detected by acoustic transducers 1520(C) and 1520(D) and the distance between acoustic transducers 1520(C) and 1520(D) is greater than, e.g., the distance between acoustic transducers 1520(D) and 1520(E), the determined source location of the detected sound may be more accurate than if the sound had been detected by acoustic transducers 1520(D) and 1520(E).

Controller 1525 of neckband 1505 may process information generated by the sensors on neckband 1505 and/or augmented-reality system 1500. For example, controller 1525 may process information from the microphone array that describes sounds detected by the microphone array. For each detected sound, controller 1525 may perform a direction-of-arrival (DOA) estimation to estimate a direction from which the detected sound arrived at the microphone array. As the microphone array detects sounds, controller 1525 may populate an audio data set with the information. In embodiments in which augmented-reality system 1500 includes an inertial measurement unit, controller 1525 may compute all inertial and spatial calculations from the IMU located on eyewear device 1502. A connector may convey information between augmented-reality system 1500 and neckband 1505 and between augmented-reality system 1500 and controller 1525. The information may be in the form of optical data, electrical data, wireless data, or any other transmittable data form. Moving the processing of information generated by augmented-reality system 1500 to neckband 1505 may reduce weight and heat in eyewear device 1502, making it more comfortable to the user.

Power source 1535 in neckband 1505 may provide power to eyewear device 1502 and/or to neckband 1505. Power source 1535 may include, without limitation, lithium ion batteries, lithium-polymer batteries, primary lithium batteries, alkaline batteries, or any other form of power storage. In some cases, power source 1535 may be a wired power source. Including power source 1535 on neckband 1505 instead of on eyewear device 1502 may help better distribute the weight and heat generated by power source 1535.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1600 in FIG. 16, that mostly or completely covers a user's field of view. Virtual-reality system 1600 may include a front rigid body 1602 and a band 1604 shaped to fit around a user's head. Virtual-reality system 1600 may also include output audio transducers 1606(A) and 1606(B). Furthermore, while not shown in FIG. 16, front rigid body 1602 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 1500 and/or virtual-reality system 1600 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1500 and/or virtual-reality system 1600 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1500 and/or virtual-reality system 1600 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

In some embodiments, one or more objects (e.g., data associated with sensors, and/or activity information) of a computing system may be associated with one or more privacy settings. These objects may be stored on or otherwise associated with any suitable computing system or application, such as, for example, a social-networking system, a client system, a third-party system, a messaging application, a photo-sharing application, a biometric data acquisition application, an artificial-reality application, and/or any other suitable computing system or application.

Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within an application (such as an artificial-reality application). When privacy settings for an object allow a particular user or other entity to access that object, the object may be described as being "visible" with respect to that user or other entity. As an example, a user of an artificial-reality application may specify privacy settings for a user-profile page that identify a set of users that may access the artificial-reality application information on the user-profile page, thus excluding other users from accessing that information. As another example, an artificial-reality application may store privacy policies/guidelines. The privacy policies/guidelines may specify what information of users may be accessible by which entities and/or by which processes (e.g., internal research, advertising algorithms, machine-learning algorithms), thus ensuring only certain information of the user may be accessed by certain entities or processes.

In some embodiments, privacy settings for an object may specify a "blocked list" of users or other entities that should not be allowed to access certain information associated with the object. In some cases, the blocked list may include third-party entities. The blocked list may specify one or more users or entities for which an object is not visible.

Privacy settings associated with an object may specify any suitable granularity of permitted access or denial of access. As an example, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. In some embodiments, different objects of the same type associated with a user may have different privacy settings. In addition, one or more default privacy settings may be set for each object of a particular object-type.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. A system comprising:
   an artificial-reality display dimensioned to be worn by a user, the artificial-reality display comprising:
      a battery; and
      at least one recipient charging element; and
   a charging case dimensioned to accommodate the artificial-reality display, the charging case comprising:
      a lid that movably closes via a hinge;
      at least one source charging element configured to interface with the recipient charging element of the artificial-reality display to facilitate charging the battery of the artificial-reality display; and
      at least one alignment guide that forces the recipient charging element of the artificial-reality display to energizingly couple with the source charging element of the charging case, wherein the alignment guide comprises a cavity dimensioned such that the lid applies pressure on the artificial-reality display when the lid is movably closed onto the artificial-reality display via the hinge, the pressure applied by the lid serving to secure continuity of the energizing coupling between the recipient charging element and the source charging element.

2. The system of claim 1, wherein the alignment guide of the charging case secures the artificial-reality display in a specific position that ensures continuity of the energizing coupling between the recipient charging element and the source charging element when the artificial-reality display is enclosed within the charging case.

3. The system of claim 2, wherein:
   the artificial-reality display comprises augmented-reality glasses having a set of temples;
   the charging case comprises one or more temple blocks positioned to support one or more of the temples of the augmented-reality glasses; and
   the alignment guide of the charging case comprise one or more indentations formed in the temple blocks, the indentations being positioned to hold the augmented-reality glasses in the specific position within the charging case.

4. The system of claim 2, wherein the alignment guide of the charging case comprise one or more mechanical pins positioned to hold the artificial-reality display in the specific position within the charging case.

5. The system of claim 2, wherein the alignment guide of the charging case comprise one or more magnetic fasteners positioned to hold the artificial-reality display in the specific position within the charging case.

6. The system of claim 1, wherein the alignment guide of the charging case comprises a cavity dimensioned to force the artificial-reality display into a specific position that ensures continuity of the energizing coupling between the recipient charging element and the source charging element upon closure of the charging case.

7. The system of claim 1, wherein:
   the charging case charges the battery of the artificial-reality display; and
   the alignment guide of the charging case prevents the recipient charging element from disengaging from the source charging element despite a jolt experienced by the charging case.

8. The system of claim 1, wherein:
   the artificial-reality display comprises augmented-reality glasses having a set of temples; and
   the charging case comprises at least one temple block that:
      is positioned to support at least one of the temples of the augmented-reality glasses; and
      incorporates the source charging element to facilitate charging the battery via the recipient charging element when the at least one of the temples of the augmented-reality glasses is supported by the temple block.

9. The system of claim 8, wherein:
the augmented-reality glasses have a front frame;
the recipient charging element is situated on an end of the front frame of the augmented-reality glasses; and
one of the temples is coupled to the end of the front frame of the augmented-reality glasses via a hinge such that the recipient charging element is accessible when the one of the temples is folded and inaccessible when the one of the temples is unfolded.

10. The system of claim 9, wherein the recipient charging element is visible when the one of the temples is folded and is concealed from view when the one of the temples is unfolded.

11. The system of claim 1, wherein:
the energizing coupling comprises an electrical coupling between the recipient charging element and the source charging element; and
the recipient charging element and the source charging element comprise electrical connectors that are configured to mate with each other and facilitate charging the battery of the artificial-reality display via the electrical coupling.

12. The system of claim 1, wherein:
the energizing coupling comprises an inductive coupling between the recipient charging element and the source charging element; and
the recipient charging element and the source charging element comprise electromagnetic coils that are configured to induce an electromotive force that facilitates charging the battery of the artificial-reality display via the inductive coupling.

13. The system of claim 1, wherein the charging case comprises an additional battery that transfers power to the battery of the artificial-reality display via the energizing coupling between the source charging element and the recipient charging element.

14. A charging case for augmented-reality glasses, the charging case comprising:
a base;
a lid movably coupled to the base via a hinge;
at least one source charging element configured to interface with a recipient charging element of the augmented-reality glasses to facilitate charging a battery of the artificial-reality display; and
at least one alignment guide that forces the recipient charging element of the augmented-reality glasses to energizingly couple with the source charging element when the augmented-reality glasses are placed in the base and the lid is closed to the base, wherein the alignment guide comprises a cavity formed by the base and the lid and is dimensioned such that the lid applies pressure on the artificial-reality display when the lid is movably closed onto the artificial-reality display via the hinge, the pressure applied by the lid serving to secure continuity of the energizing coupling between the recipient charging element and the source charging element.

15. The charging case of claim 14, wherein the alignment guide of the charging case is positioned to align the recipient charging element of the artificial-reality display with the source charging element when the artificial-reality display is placed within the charging case.

16. The charging case of claim 15, wherein the alignment guide of the charging case secures the artificial-reality display in a specific position that ensures continuity of the energizing coupling between the recipient charging element and the source charging element when the artificial-reality display is enclosed within the charging case.

17. The charging case of claim 16, further comprising at least one temple block positioned to support at least one temple of the augmented-reality glasses; and
wherein the alignment guide of the charging case comprise one or more indentations formed in the temple blocks, the indentations being positioned to hold the augmented-reality glasses in the specific position within the charging case.

18. A method comprising:
manufacturing a base of a charging case for charging an artificial-reality display;
manufacturing a lid of the charging case that is movably coupled to the base via a hinge;
incorporating, into the charging case, at least one source charging element configured to interface with a recipient charging element of the artificial-reality display to facilitate charging a battery of the artificial-reality display; and
incorporating, into the charging case, at least one alignment guide that forces the recipient charging element of the artificial-reality display to energizingly couple with the source charging element of the artificial-reality display when the artificial-reality display is placed in the base, wherein the alignment guide comprises a cavity formed by the base and the lid and is dimensioned such that the lid applies pressure on the artificial-reality display when the lid is movably closed onto the artificial-reality display via the hinge, the pressure applied by the lid serving to secure continuity of the energizing coupling between the recipient charging element and the source charging element.

* * * * *